US012755907B2

(12) United States Patent
Hasegawa et al.

(10) Patent No.: US 12,755,907 B2
(45) Date of Patent: Oct. 6, 2026

(54) THIN FILM CAPACITOR HAVING A METAL FOIL WITH ROUGHENED MAIN SURFACES, MANUFACTURING METHOD THEREFOR, AND ELECTRONIC CIRCUIT BOARD HAVING THE THIN FILM CAPACITOR

(71) Applicant: TDK CORPORATION, Tokyo (JP)

(72) Inventors: Miyu Hasegawa, Tokyo (JP); Daiki Ishii, Tokyo (JP)

(73) Assignee: TDK Corporation, Tokyo (JP)

( * ) Notice: Subject to any disclaimer, the term of this patent is extended or adjusted under 35 U.S.C. 154(b) by 141 days.

(21) Appl. No.: 18/841,735

(22) PCT Filed: Jan. 26, 2023

(86) PCT No.: PCT/JP2023/002467
§ 371 (c)(1),
(2) Date: Aug. 27, 2024

(87) PCT Pub. No.: WO2023/162568
PCT Pub. Date: Aug. 31, 2023

(65) Prior Publication Data

US 2025/0069814 A1 Feb. 27, 2025

Related U.S. Application Data

(60) Provisional application No. 63/314,695, filed on Feb. 28, 2022.

(51) Int. Cl.
*H01G 9/15* (2006.01)
*H01G 2/06* (2006.01)
(Continued)

(52) U.S. Cl.
CPC ............... *H01G 9/15* (2013.01); *H01G 2/065* (2013.01); *H01G 9/012* (2013.01); *H01G 9/048* (2013.01)

(58) Field of Classification Search
None
See application file for complete search history.

(56) References Cited

U.S. PATENT DOCUMENTS

2016/0329158 A1 11/2016 Hattori et al.
2018/0158609 A1 6/2018 Aoki
(Continued)

FOREIGN PATENT DOCUMENTS

JP 2008-078301 A 4/2008
JP 2009-224555 A 10/2009
(Continued)

OTHER PUBLICATIONS

Translation JP 2009-224555A (no date).*
(Continued)

*Primary Examiner* — Eric W Thomas
(74) *Attorney, Agent, or Firm* — Rimon P.C.

(57) ABSTRACT

To provide a thin film capacitor having a large capacitance. A thin film capacitor includes a metal foil having roughened main surfaces, a dielectric film covering the main surfaces, an electrode layer contacting the metal foil through an opening formed in the dielectric film and having a surface formed as a metal terminal, an electrode layer contacting the dielectric film without contacting the metal foil and having a surface formed as a metal terminal, and an electrode layer contacting the dielectric film without contacting the metal foil. The electrode layers include a conductive polymer layer contacting the dielectric film.

10 Claims, 47 Drawing Sheets

(51) Int. Cl.
*H01G 9/012* (2006.01)
*H01G 9/048* (2006.01)

(56) References Cited

U.S. PATENT DOCUMENTS

| | | | | |
|---|---|---|---|---|
| 2018/0158611 | A1 | 6/2018 | Arakawa et al. | |
| 2019/0267188 | A1 | 8/2019 | Fuji et al. | |
| 2023/0067888 | A1* | 3/2023 | Sundaram | H01G 9/045 |
| 2024/0186072 | A1* | 6/2024 | Yoshikawa | H01G 9/008 |

FOREIGN PATENT DOCUMENTS

| | | | |
|---|---|---|---|
| WO | 2015/118901 | A1 | 8/2015 |
| WO | 2017/014020 | A1 | 1/2017 |
| WO | 2017/026247 | A1 | 2/2017 |
| WO | 2018/092722 | A1 | 5/2018 |
| WO | 2022/004013 | A1 | 1/2022 |

OTHER PUBLICATIONS

International Search Report (with English translation) and Written Opinion dated Apr. 4, 2023, from corresponding International Application No. PCT/JP2023/002467, 10 pages.

* cited by examiner

THIN FILM CAPACITOR HAVING A METAL FOIL WITH ROUGHENED MAIN SURFACES, MANUFACTURING METHOD THEREFOR, AND ELECTRONIC CIRCUIT BOARD HAVING THE THIN FILM CAPACITOR

CROSS-REFERENCE TO RELATED APPLICATIONS

This application is the U.S. National Phase under 35 U.S.C. § 371 of International Application No. PCT/JP2023/002467, filed on Jan. 26, 2023, which claims the benefit of priority to U.S. Provisional Patent Application No. 63/314,695 filed on Feb. 28, 2022, the entire contents of each of which are hereby incorporated by reference.

TECHNICAL FIELD

The present disclosure relates to a thin film capacitor and a manufacturing method therefor and, more particularly, to a thin film capacitor using a metal foil and a manufacturing method therefor. The present disclosure also relates to an electronic circuit board having such a thin film capacitor.

BACKGROUND ART

IC-mounted circuit boards are commonly mounted with a decoupling capacitor so as to stabilize the potential of a power supply for an IC. As the decoupling capacitor, multilayer ceramic chip capacitor is typically used, and a large number of the multilayer ceramic chip capacitors are mounted on the surface of the circuit board to thereby achieve required decoupling capacitance.

In recent years, a mounting space for a large number of multilayer ceramic chip capacitors may become insufficient due to miniaturization of a circuit board. To cope with this, a thin film capacitor capable of being embedded in a circuit board is sometimes used in place of the multilayer ceramic chip capacitor (see Patent Documents 1 to 4).

A thin film capacitor described in Patent Document 1 uses a porous metal substrate and is structured such that an upper electrode is formed on the surface of the porous metal substrate with a dielectric film interposed therebetween. A thin-film capacitor described in Patent Document 2 uses a metal substrate whose one main surface is roughened and is structured such that an upper electrode is formed on the roughened surface with a dielectric film interposed therebetween. Thin film capacitors described in Patent Documents 3 and 4 are structured such that a conductive porous substrate is formed as a support, and an upper electrode is formed on a roughened surface of the substrate with a dielectric film interposed therebetween.

CITATION LIST

Patent Document

[Patent Document 1] International Publication WO 2015/118901

[Patent Document 2] International Publication WO 2018/092722

[Patent Document 3] International Publication WO 2017/026247

[Patent Document 4] International Publication WO 2017/014020

DISCLOSURE OF THE INVENTION

Problem to be Solved by the Invention

However, the thin film capacitor described in Patent Document 1 has a side surface electrode structure, so that the line length of the electrode is long, which causes a structural problem of increasing an ESR (Equivalent Series Resistance and an ESL (Equivalent Series Inductance). In addition, the thin film capacitor described in Patent Document 1 uses a metal substrate which is made entirely porous, so that it is not easy to separate a lower electrode constituted by the metal substrate and the upper electrode covering the metal substrate through the dielectric film, which disadvantageously makes it likely to cause a short circuit failure. In the thin film capacitor described in Patent Document 2, one main surface of the metal substrate functions as the upper electrode, and the other main surface thereof functions as a lower electrode, so that, in order to dispose a pair of terminal electrodes on the same plane, it is necessary to route the electrode through the side surface of an element, complicating the structure. In the thin film capacitors described in Patent Documents 3 and 4, a pair of terminal electrodes are disposed on both surfaces of a metal substrate, respectively, preventing access to the terminal electrode pair from one side. In addition, the presence of the support increases the entire thickness.

An object of the present disclosure is therefore to provide an improved thin film capacitor and a manufacturing method therefor. Another object of the present disclosure is to provide an electronic circuit board having such a thin film capacitor.

Means for Solving the Problem

A thin film capacitor according to one aspect of the present disclosure includes a metal foil having a first main surface and a second main surface opposite to the first main surface, both the first and second main surfaces being roughened, a first dielectric film covering the first main surface of the metal foil, a second dielectric film covering the second main surface of the metal foil, a first electrode layer contacting the metal foil through an opening formed in the first dielectric film and having a surface formed as a first metal terminal, a second electrode layer contacting the first dielectric film without contacting the metal foil and having a surface formed as a second metal terminal, and a third electrode layer contacting the second dielectric film without contacting the metal foil, wherein the second electrode layer includes a first conductive polymer layer contacting the first dielectric film, and wherein the third electrode layer includes a second conductive polymer layer contacting the second dielectric film.

A method of manufacturing a thin film capacitor according to one aspect of the present disclosure includes roughening a first main surface of a metal foil and a second main surface opposite to the first main surface, forming first and second dielectric films respectively on the first and second main surfaces of the metal foil, exposing a part of the metal foil by removing a part of the first dielectric film, covering the first and second dielectric films respectively with first and second conductive polymer layers, forming a first electrode layer contacting the part of the metal foil and having a surface formed as a first metal terminal, and forming a second metal terminal connected to the first conductive polymer layer.

Advantageous Effect of the Invention

According to the present disclosure, the first dielectric film has an opening, so that it is possible to dispose a part of terminal electrodes on the same plane without using a side surface electrode. In addition, the first and second dielectric films are covered respectively with the first and second conductive polymer layers, so that a larger capacitance can be obtained.

MODE FOR CARRYING OUT THE INVENTION

Hereinafter, some embodiments of the present disclosure will be described in detail with reference to the accompanying drawings.

Figure 1A:
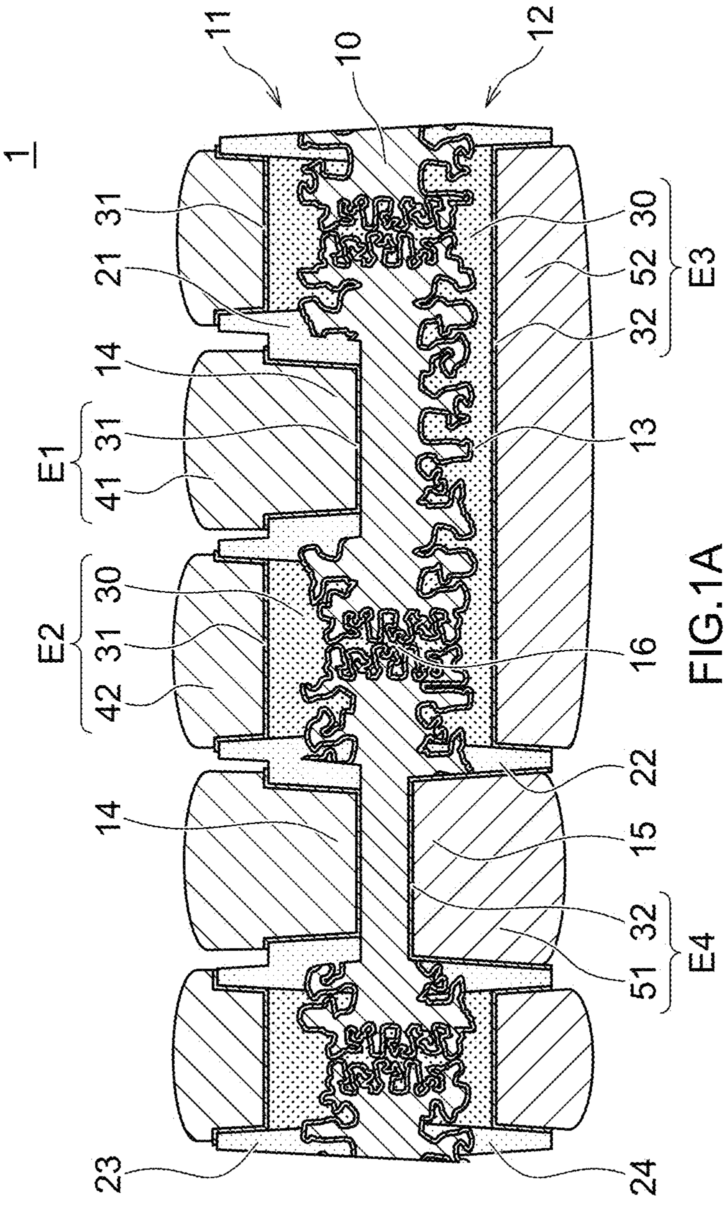
FIG. 1A is a schematic cross-sectional view for explaining the structure of a thin film capacitor 1 according to a first embodiment of the present disclosure.
Figure 1B:
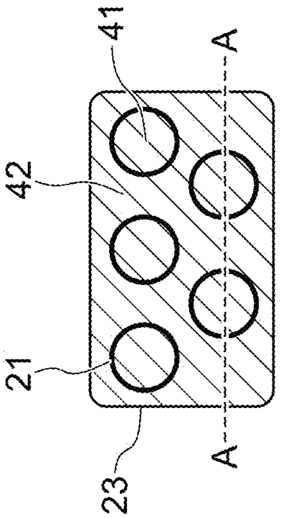
FIG. 1B is a schematic plan view of the thin film capacitor 1.
Figure 2A:
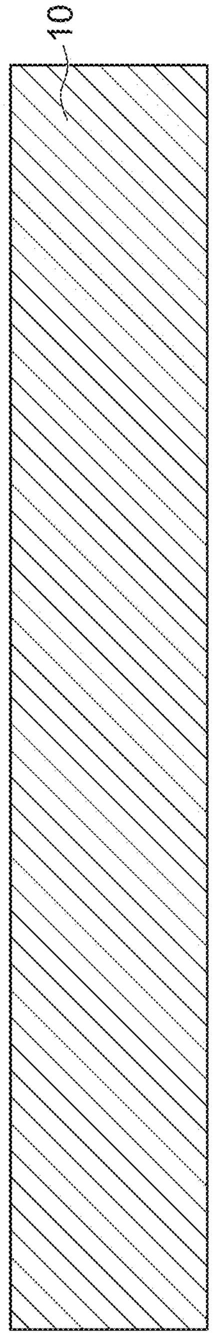
FIGS. 2A to 38A are schematic cross-sectional views for explaining a manufacturing process of the thin film capacitor 1 and taken along the line A-A in FIGS. 2B to 38B.
Figure 2B:
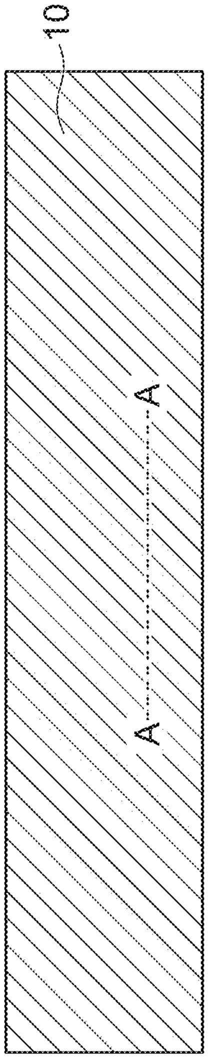
Figure 3A:
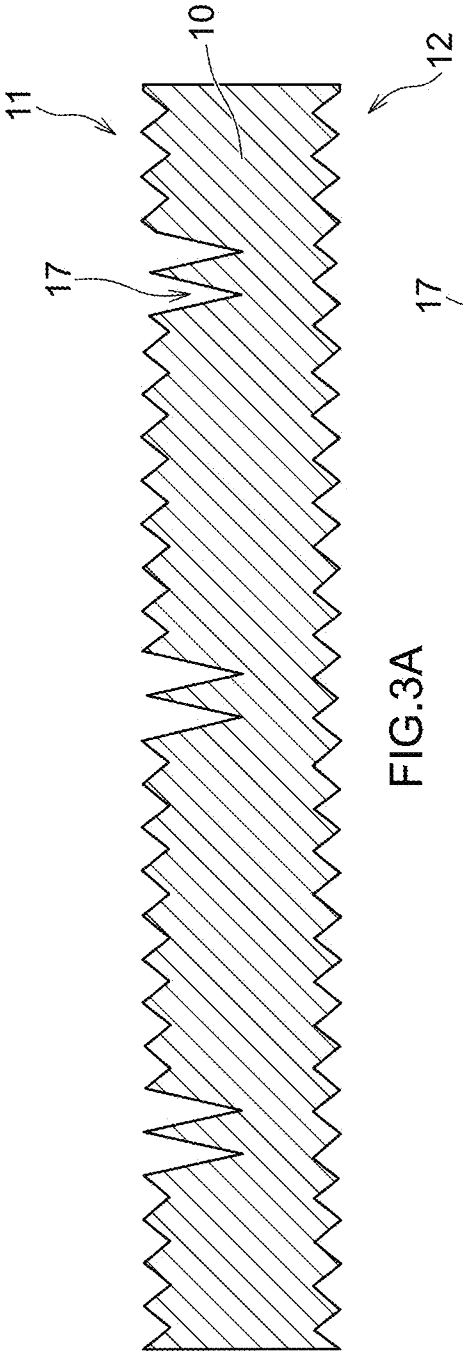
Figure 3B:
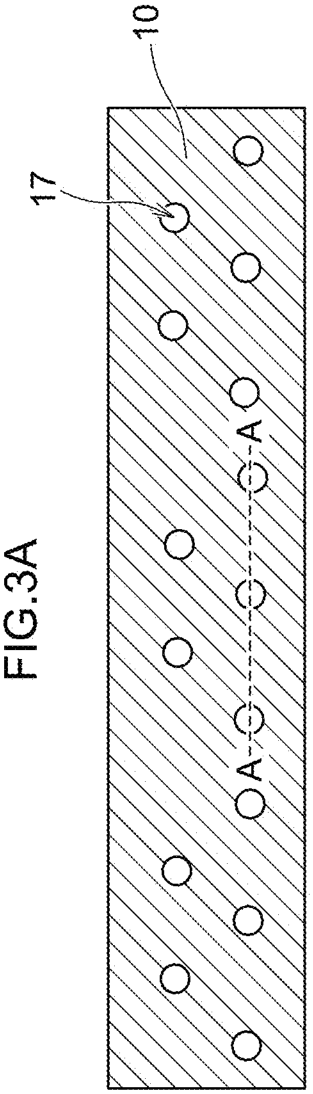

FIG. 1A is a schematic cross-sectional view for explaining the structure of a thin film capacitor 1 according to a first embodiment of the present disclosure. FIG. 1B is a schematic plan view of the thin film capacitor 1. FIG. 1A illustrates a cross section taken along the line A-A in FIG. 1B.

As illustrated in FIGS. 1A and 1B, the thin film capacitor 1 according to the first embodiment includes a metal foil 10, electrode layers E1 and E2 formed on a main surface 11 as the upper surface of the metal foil 10, and electrode layers E3 and E4 formed on a main surface 12 as the lower surface of the metal foil 10. The metal foil 10 is made of a metal material such as aluminum, copper, chrome, nickel, or tantalum, and both the main surfaces 11 and 12 thereof are roughened. Aluminum is most preferable as the material of the metal foil 10. The center portion of the metal foil 10 in the thickness direction thereof is not roughened. A dielectric film 13 is formed on the roughened main surfaces 11 and 12 of the metal foil 10. When the metal foil 10 is made of aluminum, the dielectric film 13 may be made of, for example, aluminum oxide.

A plurality of ring-shaped or polygonal annular insulating resin 21 and an insulating resin 23 extending along the outer periphery of the main surface 11 are formed on the main surface 11 as the upper surface of the metal foil 10. Similarly, a plurality of ring-shaped or polygonal annular insulating resin 22 and an insulating resin 24 extending along the outer periphery of the main surface 12 are formed on the main surface 12 as the lower surface of the metal foil 10. The dielectric film 13 is removed in a region surrounded by each of the insulating resins 21 and 22.

The electrode layer E1 is formed in a region surrounded by the insulating resin 21. The electrode layer E2 is formed outside the region surrounded by the insulating resin 21 but inside a region surrounded by the insulating resin 23. As a result, the electrode layer E1 is connected to the non-roughened center portion of the metal foil 10, while the electrode layer E2 is insulated from the metal foil 10 by the dielectric film 13. The electrode layers E1 and E2 are insulated from each other by the insulating resin 21. Thus, the electrode layers E1 and E2 function as a pair of capacitive electrodes facing each other through the dielectric film 13.

Similarly, the electrode layer E4 is formed in a region surrounded by the insulating resin 22. The electrode layer E3 is formed outside the region surrounded by the insulating resin 22 but inside a region surrounded by the insulating resin 24. As a result, the electrode layer E4 is connected to the non-roughened center portion of the metal foil 10, while the electrode layer E3 is insulated from the metal foil 10 by the dielectric film 13. The electrode layers E3 and E4 are insulated from each other by the insulating resin 22. Thus, the electrode layers E3 and E4 function as a pair of capacitive electrodes facing each other through the dielectric film 13.

The electrode layers E1 and E4 respectively have metal terminals 41 and 51 constituting the surfaces of the respective electrode layers E1 and E4. The electrode layers E1 and E4 may respectively include seed layers 31 and 32 which are respectively provided between the metal terminals 41, 51 and the metal foil 10. The metal foil 10 has grooves 14 and 15 at portions connected respectively with the electrode layers E1 and E4. The depth of each of the grooves 14 and 15 is equal to or more than the thickness of the roughened surface layer portion of the metal foil 10. Thus, the non-roughened center portion of the metal foil 10 is exposed to the bottom portion of each of the grooves 14 and 15. The center portion of the metal foil exposed to the bottom portion of each of the grooves 14 and 15 may be flat. The bottom portion of the groove 14 contacts the seed layer 31 and insulating resin 21, and the bottom portion of the groove 15 contacts the seed layer 32 and insulating resin 22.

The electrode layers E2 and E3 respectively have conductive polymer layers 30 and 30 contacting the dielectric film 13 without contacting the metal foil 10 and metal terminals 42 and 52 formed respectively on the conductive polymer layers 30 and 30 and constituting the surfaces of the respective electrode layers E2 and E3. The electrode layers E2 and E3 may respectively include seed layers 31 and 32 which are respectively provided between the metal terminals 42, 52 and the conductive polymer layer 30.

The material of the metal terminals 41, 42, 51, and 52 may be a metal material such as copper, nickel, gold, or an alloy thereof. The metal terminals 41, 42, 51, and 52 may have a structure in which these metal materials are laminated. The material of the seed layers 31 and 32 is preferably a material having a barrier function capable of preventing diffusion of copper or the like contained in the metal terminals 41, 42. 51, and 52, having high adhesion with respect to the metal foil 10 and conductive polymer layer 30, and causing no damage on the conductive polymer layer 30.

As illustrated in FIG. 1A, the metal foil 10 has a plurality of through holes 16. The inner wall of the through hole 16 is covered with the dielectric film 13, preventing the metal foil 10 from being exposed in the formation portion of the through hole 16. The through hole 16 is formed at a portion overlapping both the electrode layers E2 and E3, and the conductive polymer layer 30 is provided in a region surrounded by the inner wall of the through hole 16. As a result, the conductive polymer layer provided on the main surface 11 side of the metal foil and the conductive polymer layer 30 provided on the main surface 12 side of the metal foil 10 are connected through the conductive polymer layer 30 provided in the through hole 16.

With the above configuration, the electrode layers E1 and E4 are electrically connected to the metal foil 10, while the electrode layers E2 and E3 are not electrically connected to the metal foil 10 but insulated therefrom by the dielectric film 13. As a result, a capacitor is formed with the electrode layers E1 and E4 as one electrode and the electrode layers E2 and E4 as the other electrode. Since not only the main surface 11 of the metal foil 10 but also the main surface 12 is roughened, and the conductive polymer layer 30 is provided on both the main surfaces 11 and 12 through the dielectric film 13, a large capacitance can be obtained. Further, since the inner wall of the through hole 16 is also roughened and covered with the dielectric film 13, a larger capacitance can be obtained.

The thin film capacitor 1 according to the present embodiment can be used as a decoupling capacitor when being embedded in a multilayer substrate. In the thin film capacitor 1 according to the present embodiment, the electrode layers E1 and E2 are exposed to the main surface 11 side of the metal foil 10, and the electrode layers E3 and E4 are exposed to the main surface 12 side of the metal foil 10, allowing the decoupling capacitor to be accessed from the both surfaces. In addition, the electrode layer E1 is divided into a plurality of parts, so that ESR and ESL can be reduced as compared with when the number of the electrode layers E1 is one.

The following describes an example of a manufacturing method for the thin film capacitor 1. FIGS. 2A to 38A are schematic cross-sectional views taken along the line A-A in FIGS. 2B to 38B.

Figure 4A:
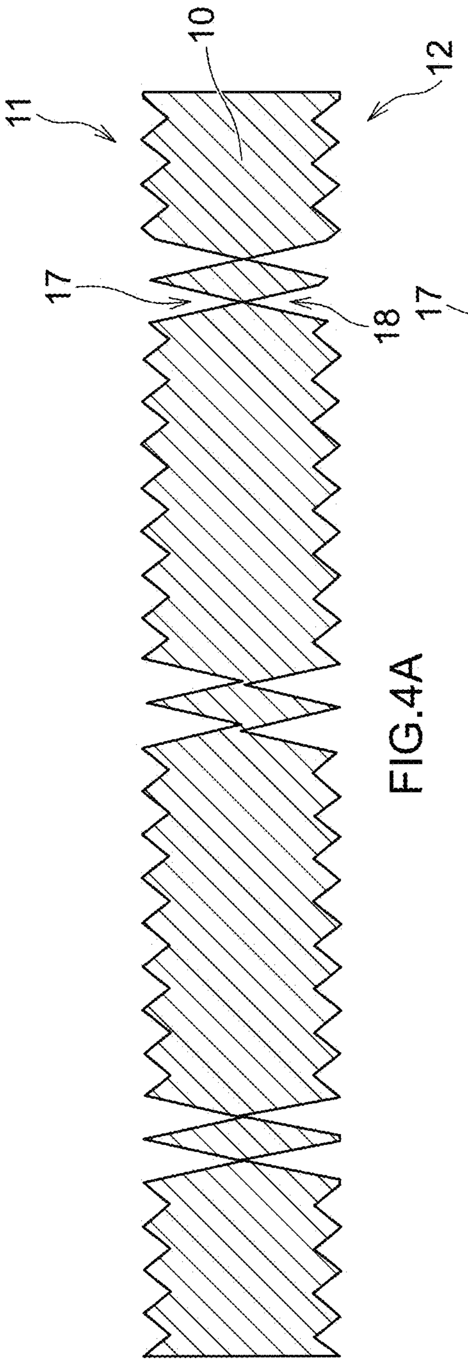
Figure 4B:
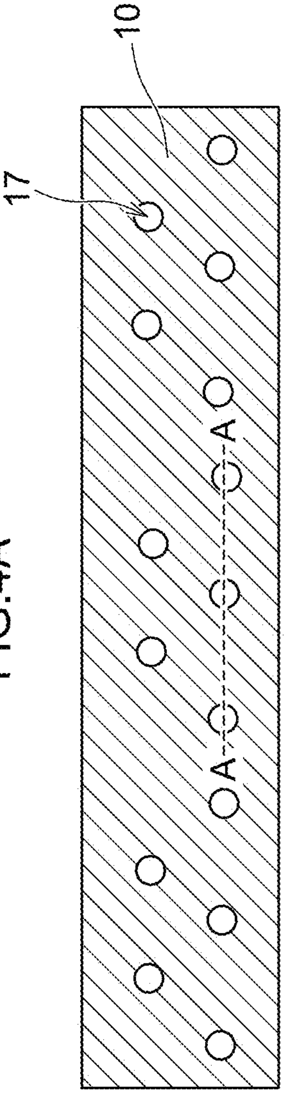

First, the metal foil 10 with a thickness of about 50 μm is prepared (FIGS. 2A and 2B), and a plurality of recesses 17 serving as starting points of etching are formed in the main surface 11 of the metal foil 10 (FIGS. 3A and 3B) and, similarly, a plurality of recesses 18 serving as starting points of etching are formed in the main surface 12 of the metal foil 10 (FIGS. 4A and 4B). The plane positions of the recesses 17 and those of the recesses 18 substantially coincide with each other. At this time point, the recesses 17 and 18 need not be connected to each other. The recesses 17 and 18 may be formed by press working or the like. Slight irregularities may be formed by press working on the surface where the recesses 17 and 18 are not formed.

Figure 5A:
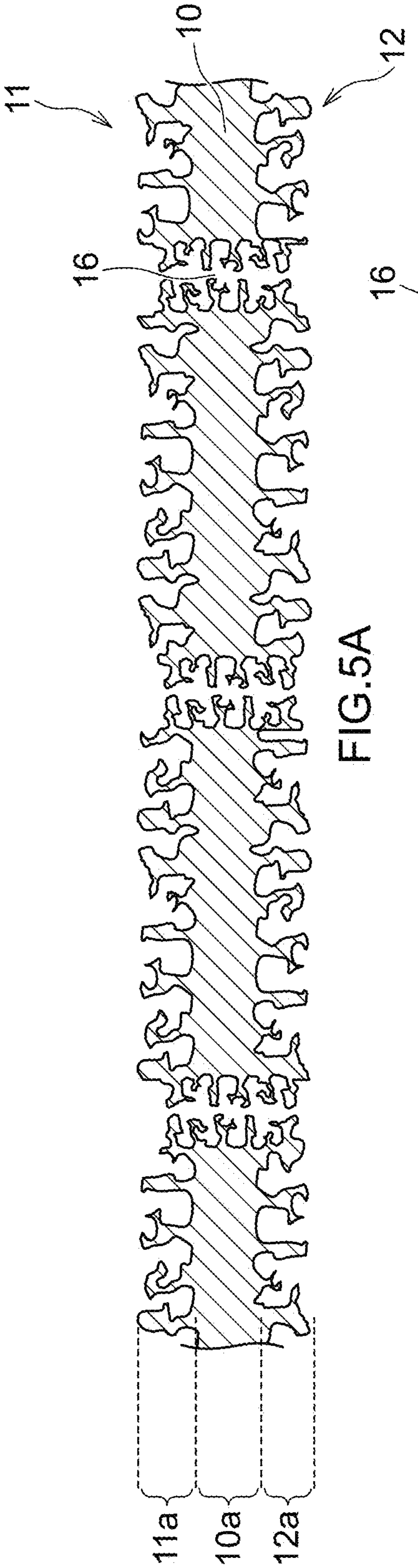
Figure 5B:
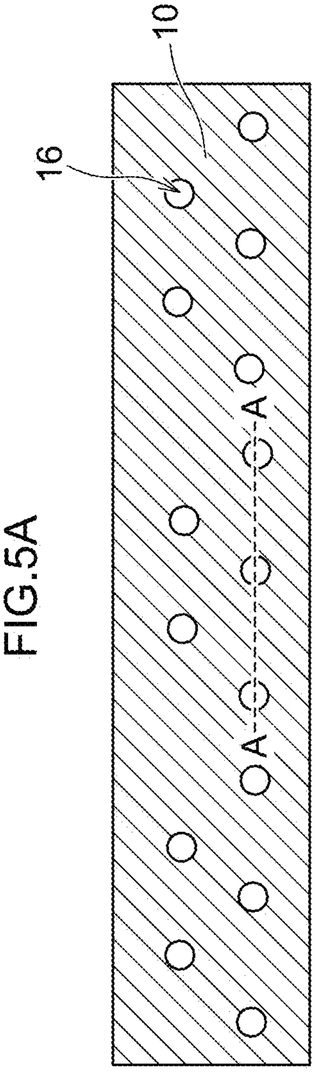

Subsequently, both the main surfaces of the metal foil 10 are etched for roughening (FIGS. 5A and 5B). As a result, there are formed, in the metal foil 10, a porous layer 11*a* positioned on the main surface 11 side and a porous layer 12*a* positioned on the main surface 12 side, and a through hole 16 is formed at a position corresponding to the recesses 17 and 18. The center portion between the porous layers 11*a* and 12*a* is a non-porous layer 10*a* which is not subjected to roughening. The metal foil 10 is preferably etched under a condition that the surface area of each of the main surfaces 11 and 12 is increased as much as possible.

Figure 6A:
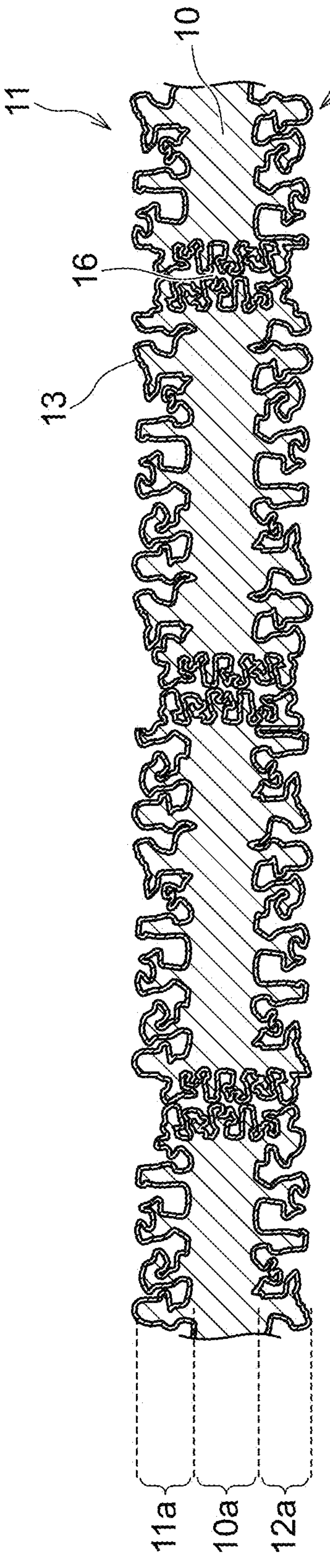
Figure 6B:
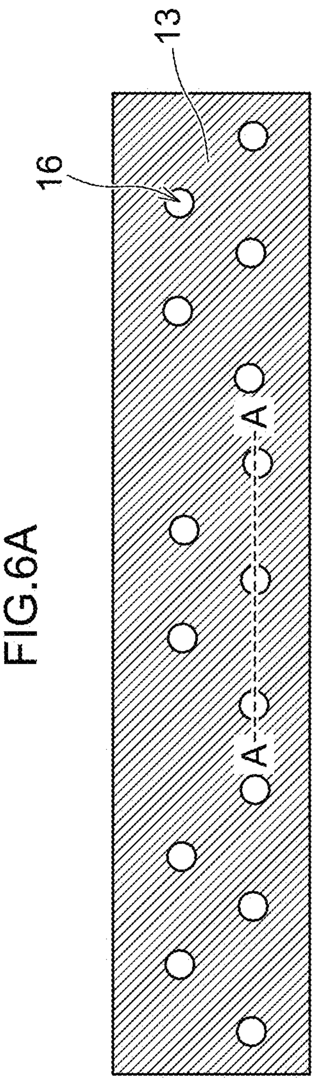

Then, the dielectric film 13, which is made of aluminum oxide or the like, is formed on the surface of the metal foil 10 (FIGS. 6A and 6B). As a result, the dielectric film 13 covers the main surfaces 11 and 12 of the metal foil 10 and the inner wall of the through hole 16. The dielectric film 13 may be formed through oxidation of the metal foil 10 which is made of aluminum or the like or using a film formation method excellent in coverage performance, such as an ALD method, a CVD method, or a mist CVD method. As the material of the dielectric film 13, $TiO_2$, $Ta_2O_5$, or the like may be used in place of $Al_2O_3$.

Figure 7A:
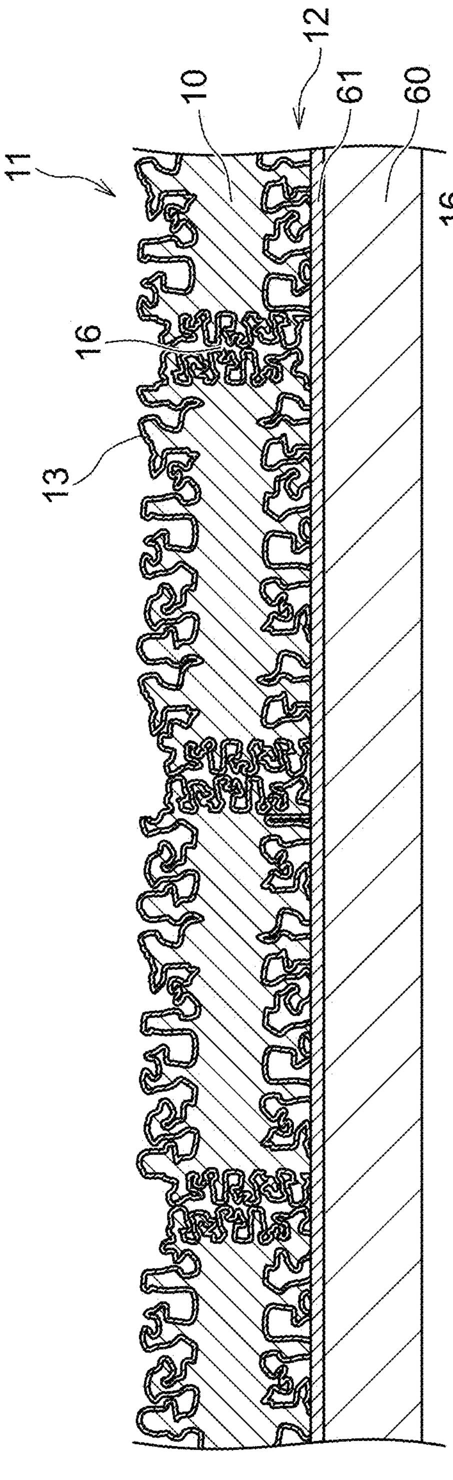
Figure 7B:
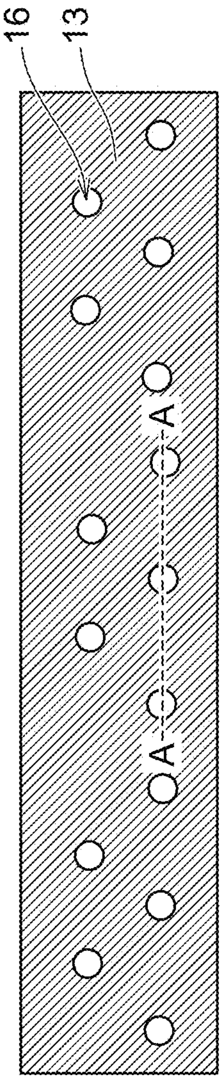
Figure 8A:
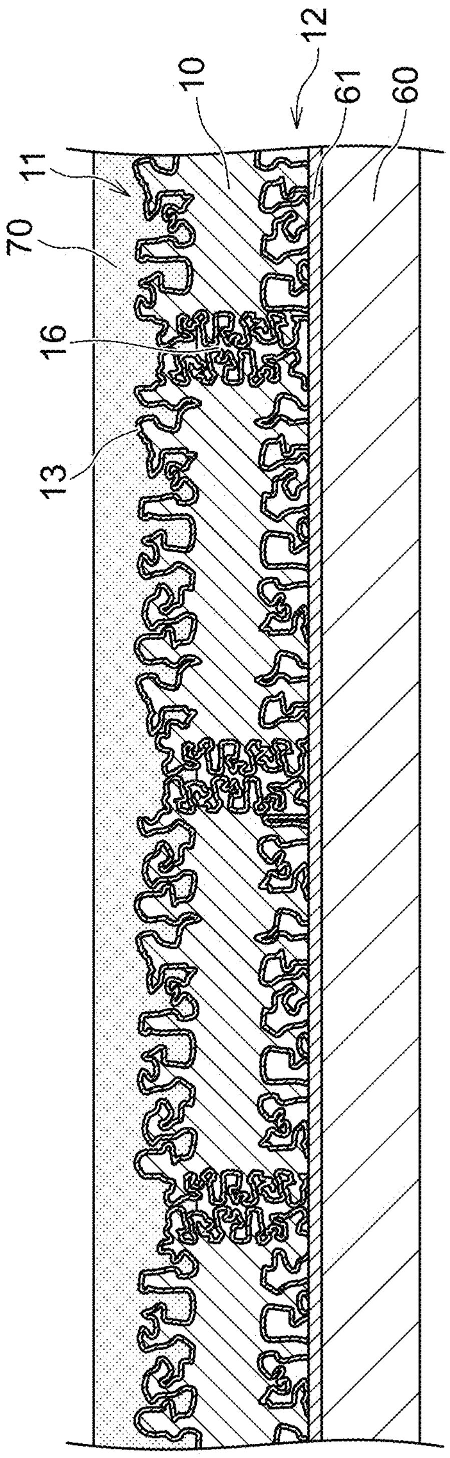
Figure 8B:
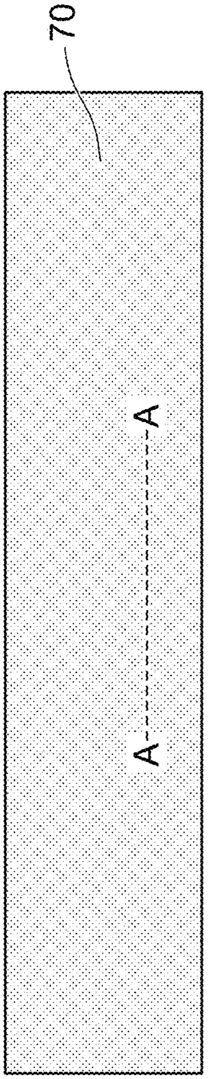
Figure 9A:
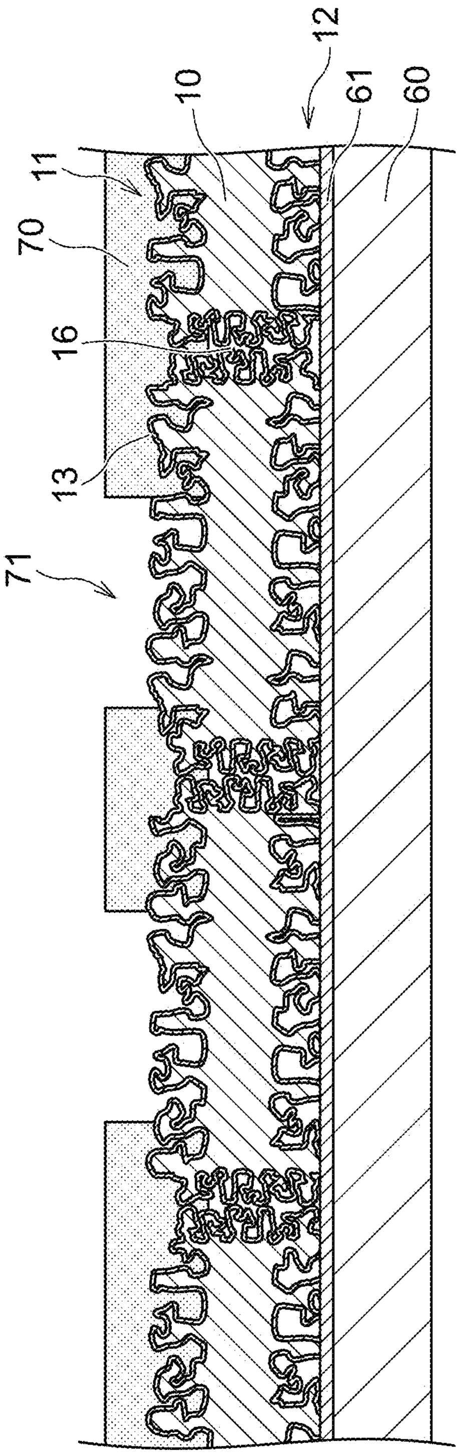
Figure 9B:
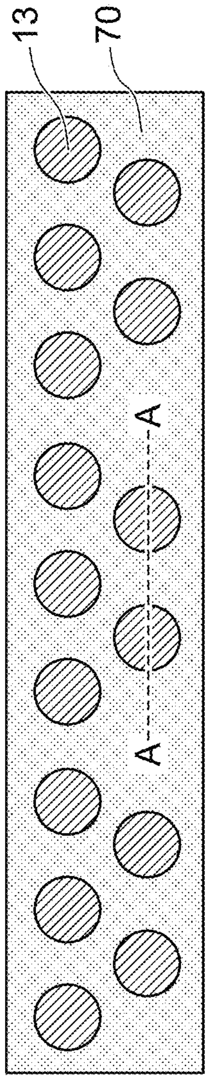
Figure 10A:
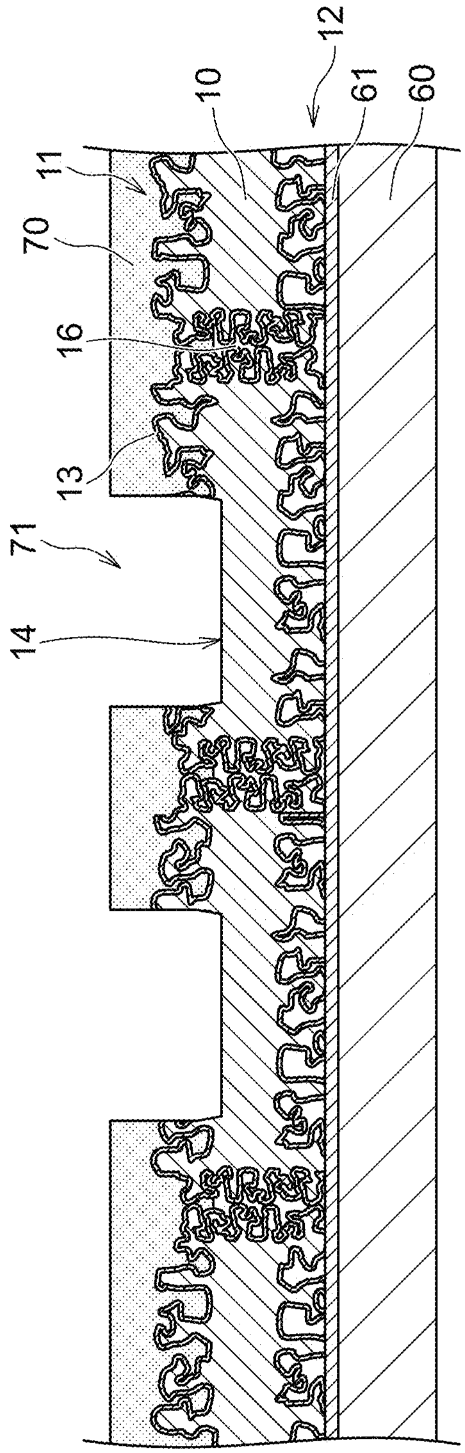
Figure 10B:
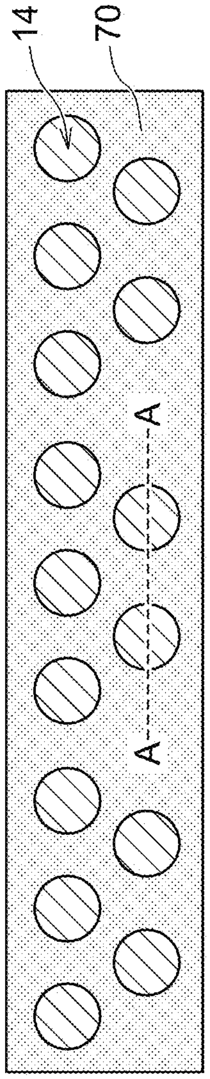
Figure 11A:
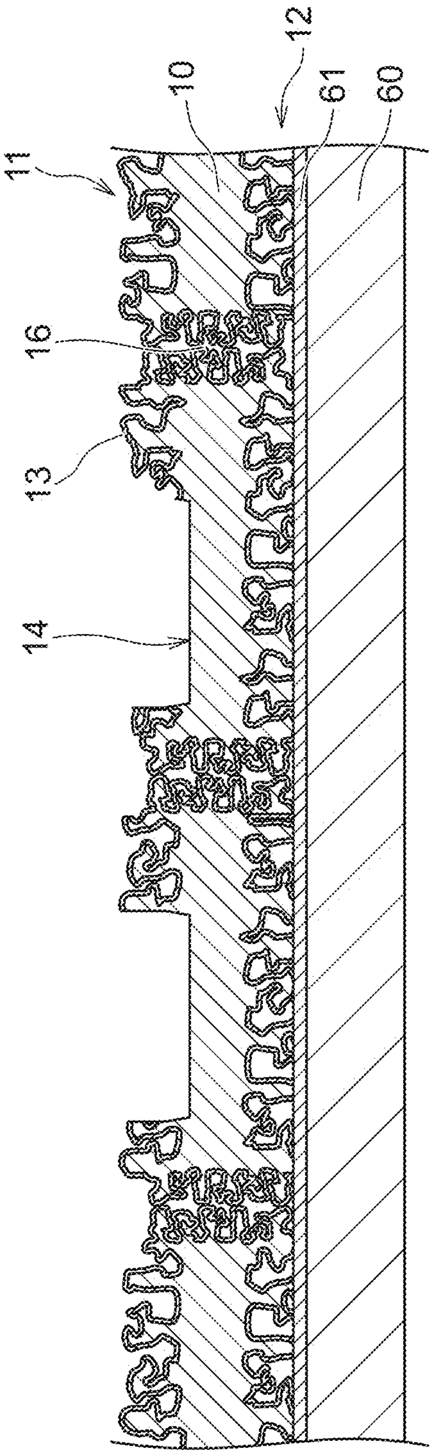
Figure 11B:
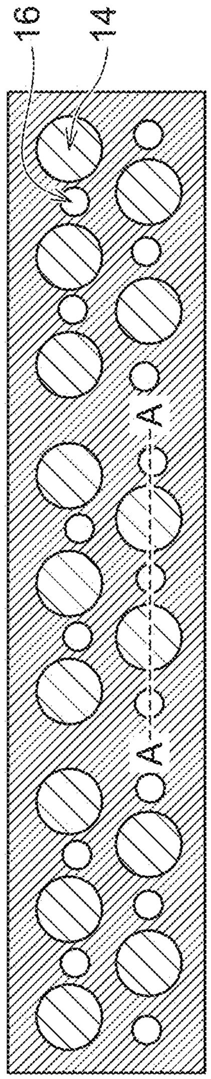
Figure 12A:
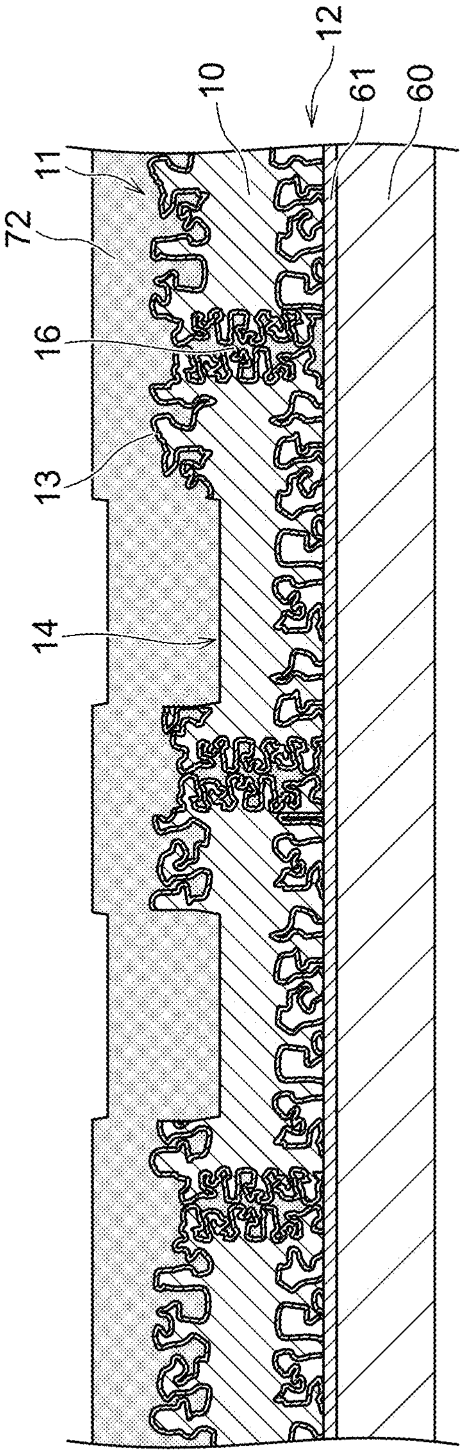
Figure 12B:
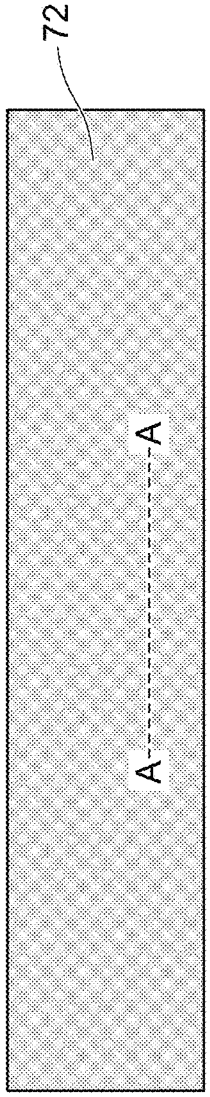

Then, the metal foil 10 is placed on a support substrate 60 through an adhesive layer 61 (FIGS. 7A and 7B). After that, a photosensitive liquid resist 70 is applied onto the main surface 11 of the metal foil 10 that faces away from the support substrate 60 (FIGS. 8A and 8B), followed by exposure and development, to thereby form an opening 71 in the resist 70 (FIGS. 9 and 9B). Subsequently, the dielectric film 13 and metal foil 10 are etched using the resist 70 as a mask to form the groove 14 in the metal foil 10 (FIGS. 10A and 10B). The depth of the groove 14 is set equal to or more than the thickness of the porous layer 11*a* illustrated in FIG. 6A. As a result, the non-porous layer 10*a* as the center portion of the metal foil 10 is exposed in the bottom of the groove 14.

Figure 13A:
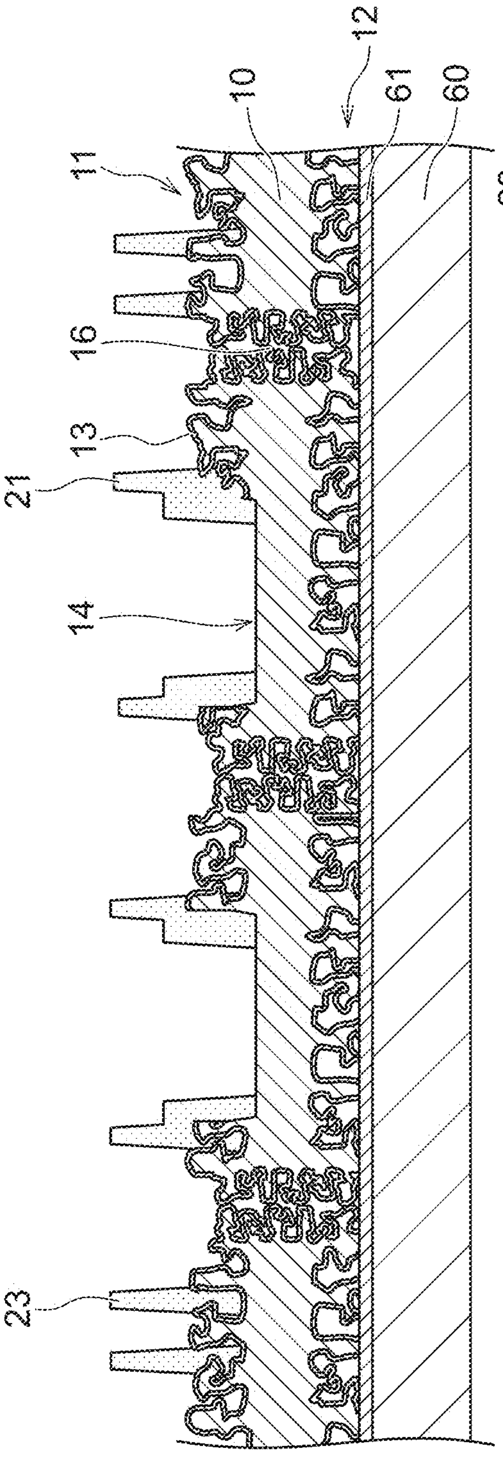
Figure 13B:
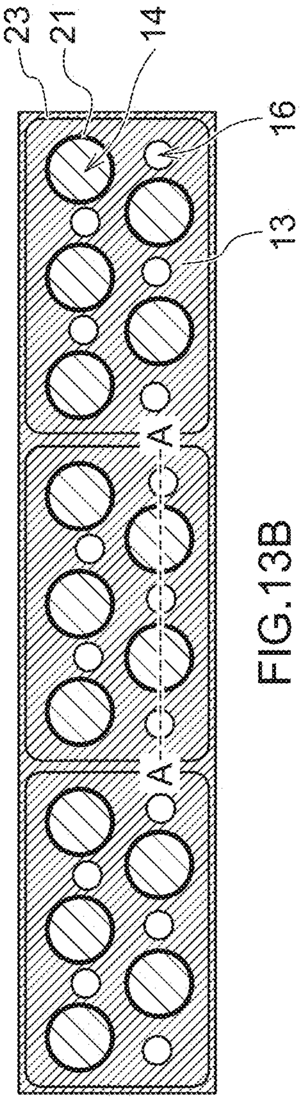
Figure 14A:
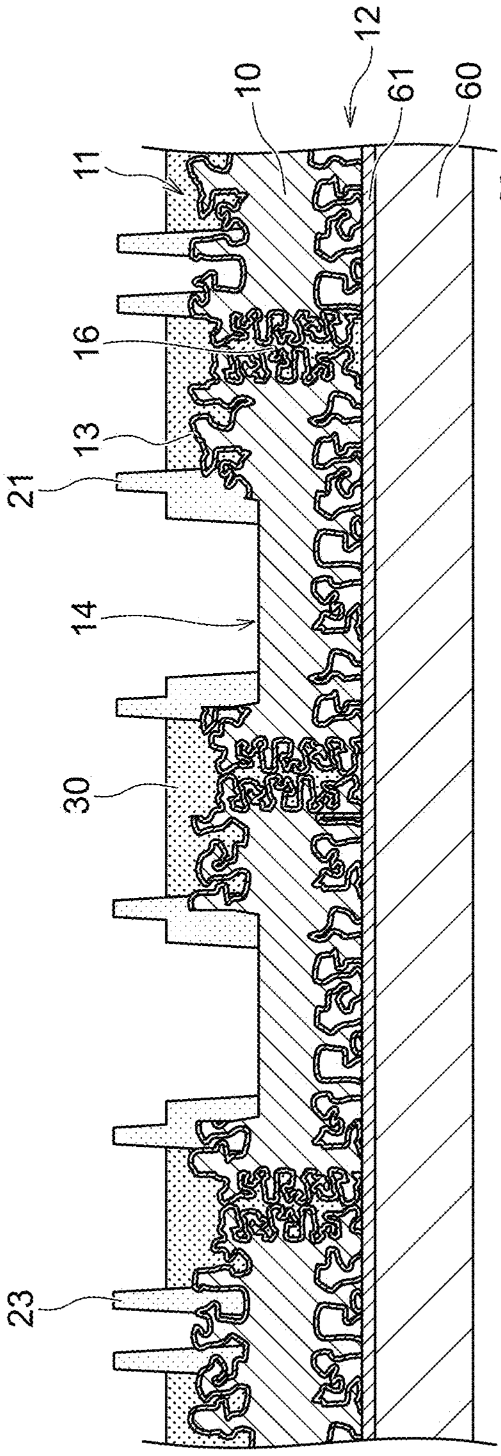
Figure 14B:
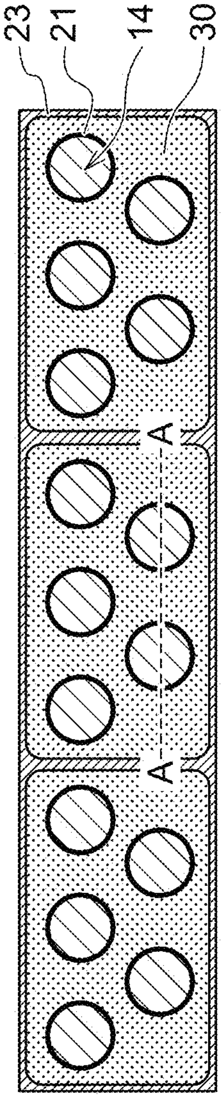

Subsequently, after removal of the resist 70 (FIGS. 11A and 11B), a photosensitive insulating resin 72 is formed on the main surface 11 of the metal foil 10 (FIGS. 12A and 12B), followed by exposure and development, to pattern the insulating resin 72 (FIGS. 13A and 13B). As a result, the ring-shaped insulating resins 21 and 23 are formed on the main surface 11 of the metal foil 10. The inner peripheral wall of the ring-shaped insulating resin 21 is preferably positioned inside the groove 14 formed in the metal foil 10. The outer peripheral wall of the ring-shaped insulating resin 21 needs to be positioned outside the groove 14 formed in the metal foil 10. Then, the conductive polymer layer 30 is formed outside a region surrounded by the insulating resin 21 but inside a region surrounded by the insulating resin 23 (FIGS. 14A and 14B). As a result, the conductive polymer layer 30 enters also the inside of the through hole 16. On the other hand, the conductive polymer layer 30 is not formed in a region surrounded by the insulating resin 21 and outside a region surrounded by the insulating resin 23.

Figure 15A:
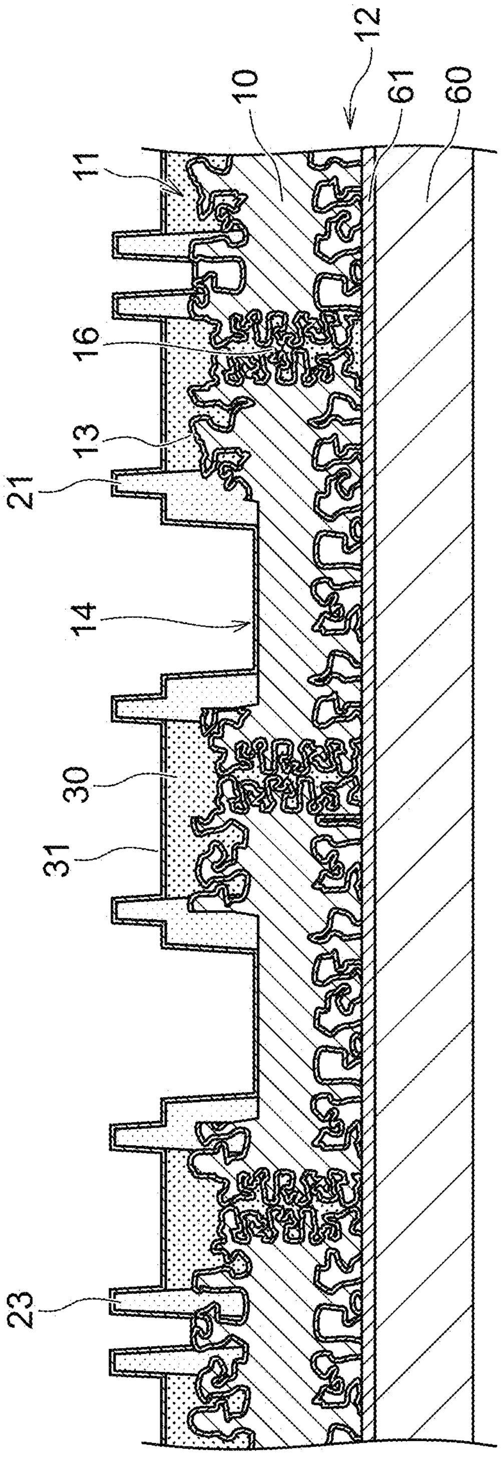
Figure 15B:
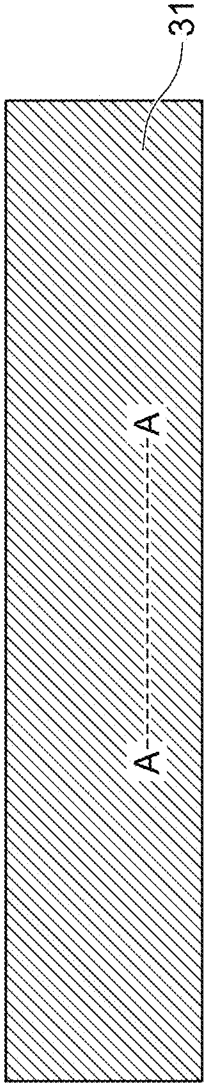
Figure 16A:
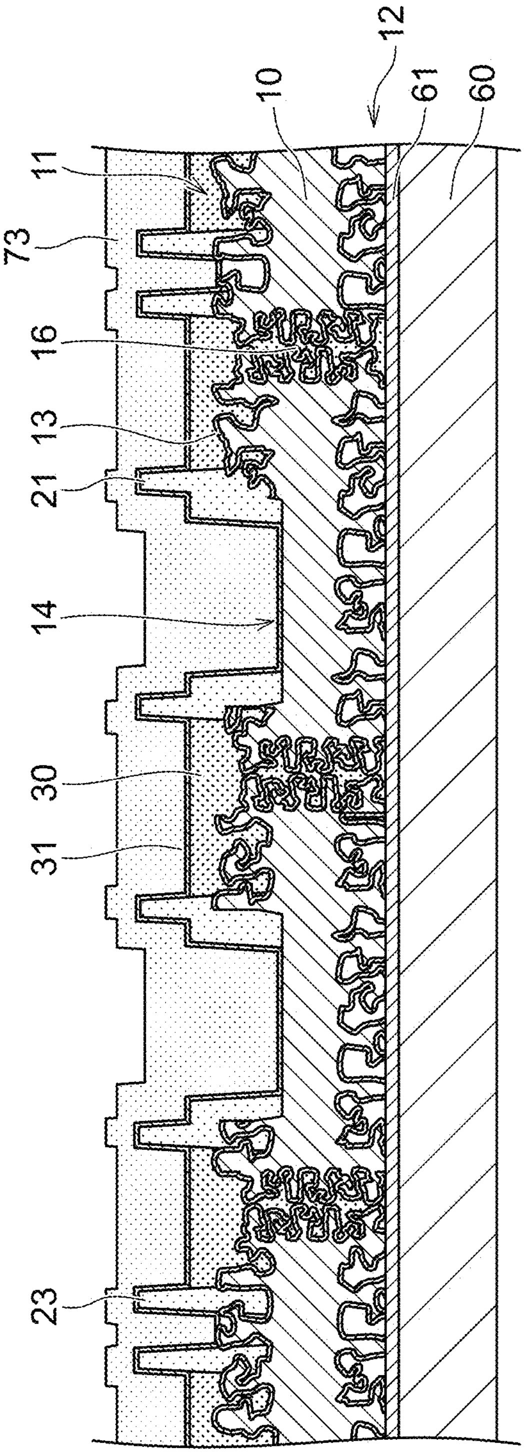
Figure 16B:
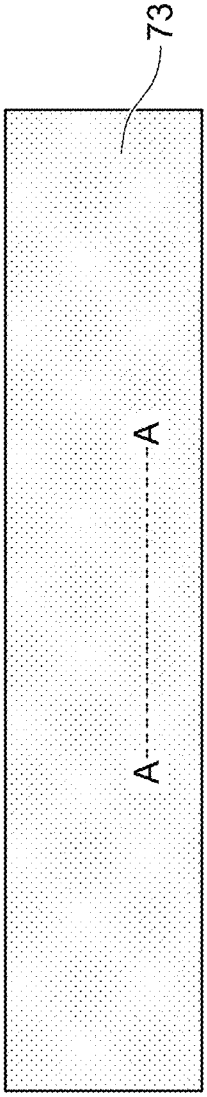
Figure 17A:
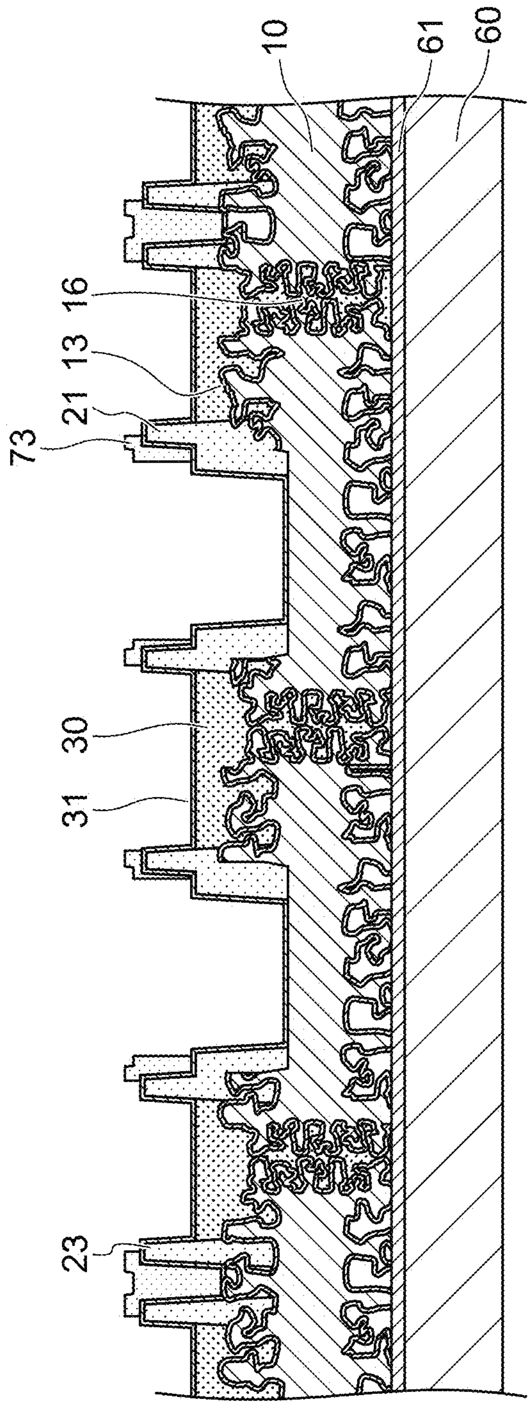
Figure 17B:
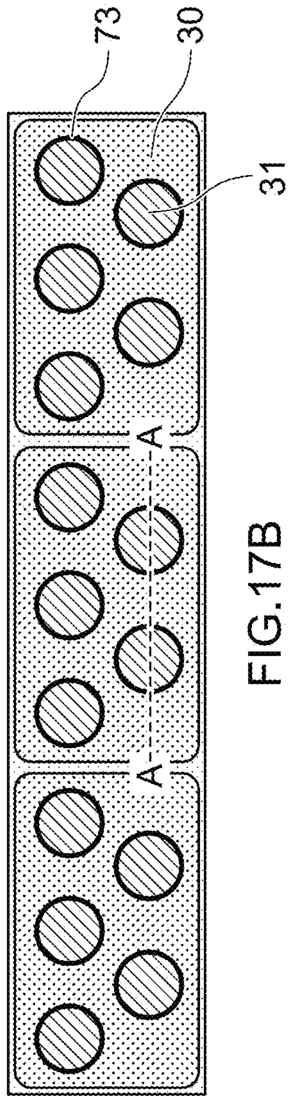
Figure 18A:
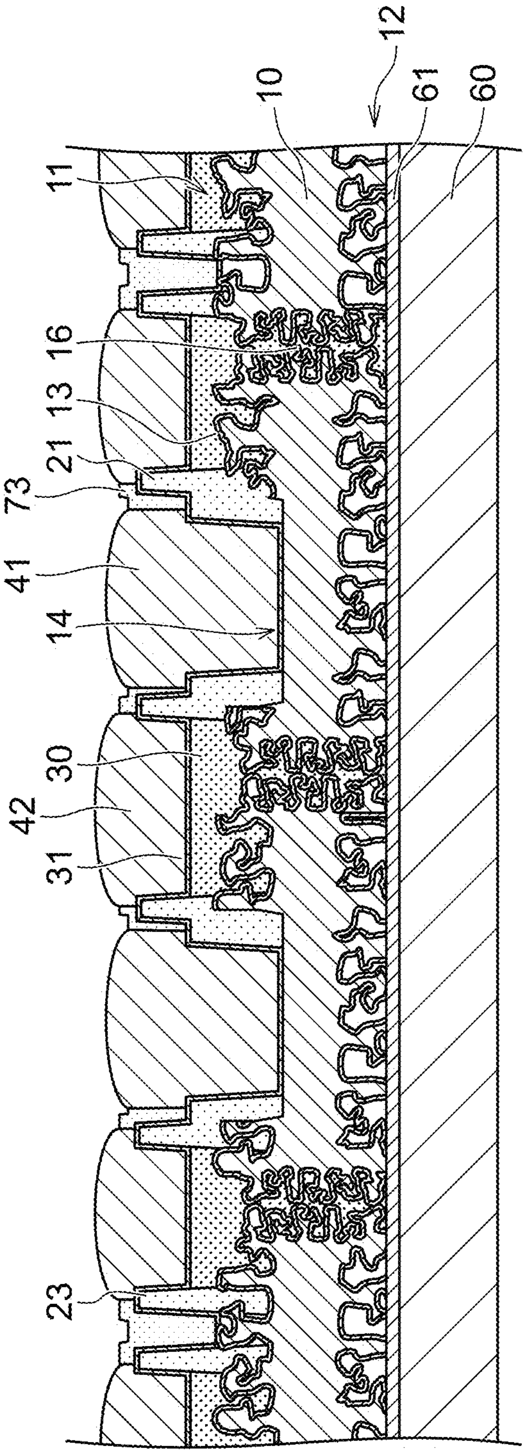
Figure 18B:
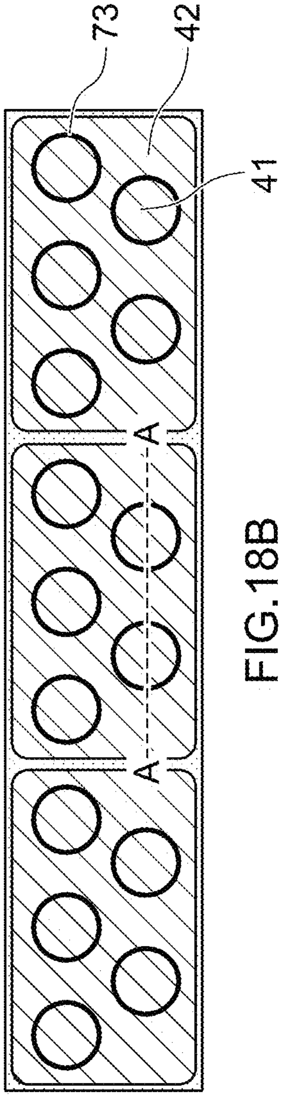
Figure 19A:
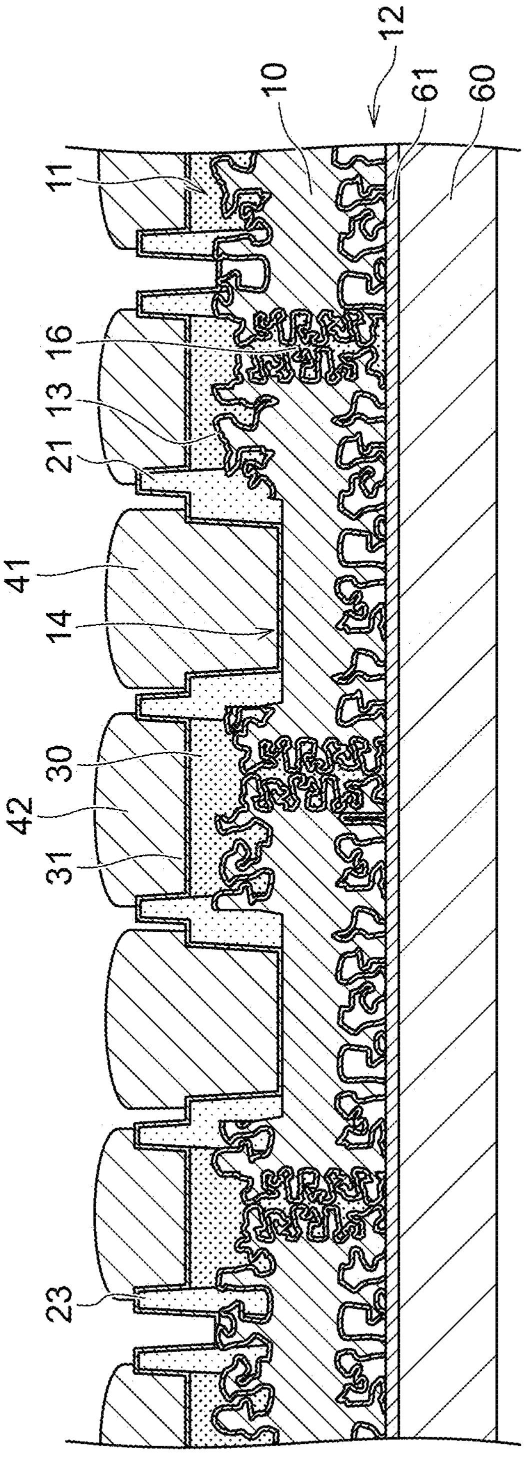
Figure 19B:
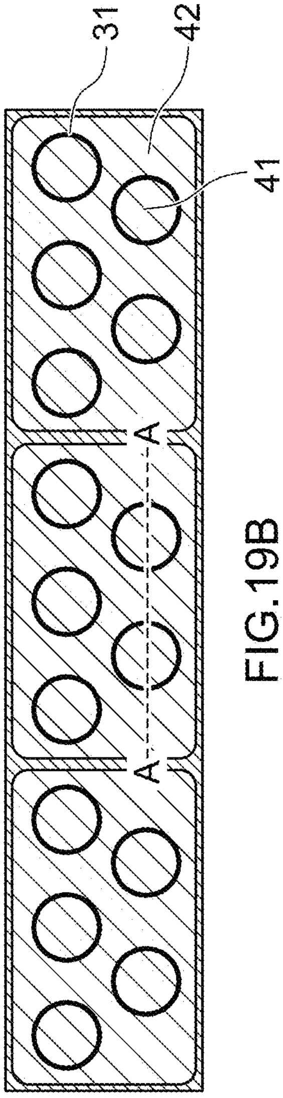

Then, the seed layer 31 is formed on the entire surface on the main surface 11 side using a sputtering method or the like (FIGS. 15A and 15B). Before the seed layer 31 is formed, a residue remaining on the surface may be removed by reverse sputtering. Subsequently, a photosensitive liquid resist 73 is applied onto the entire surface (FIGS. 16A and 16B), followed by exposure and development, to pattern the resist 73 (FIGS. 17A and 17B). As a result, the seed layer 31 on which the metal terminals 41 and 42 are to be formed is exposed. Subsequently, electrolytic plating is performed to form the metal terminals 41 and 42 (FIGS. 18A and 18B), whereby the metal terminal 41 is connected to the metal foil 10, and the metal termina 42 is connected to the conductive polymer layer 30 covering the dielectric film 13.

Figures 20A, 20B:
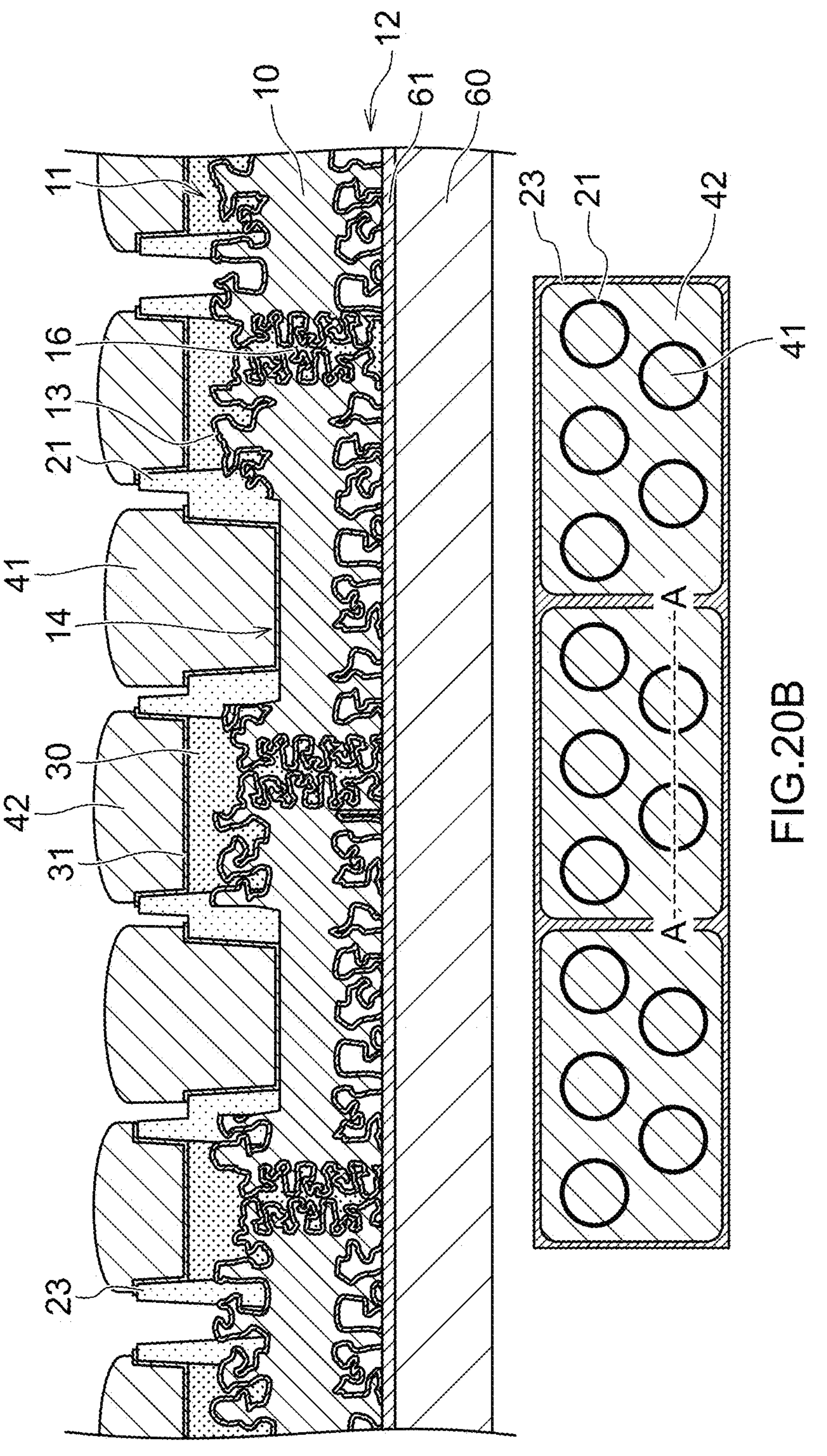
Figure 21A:
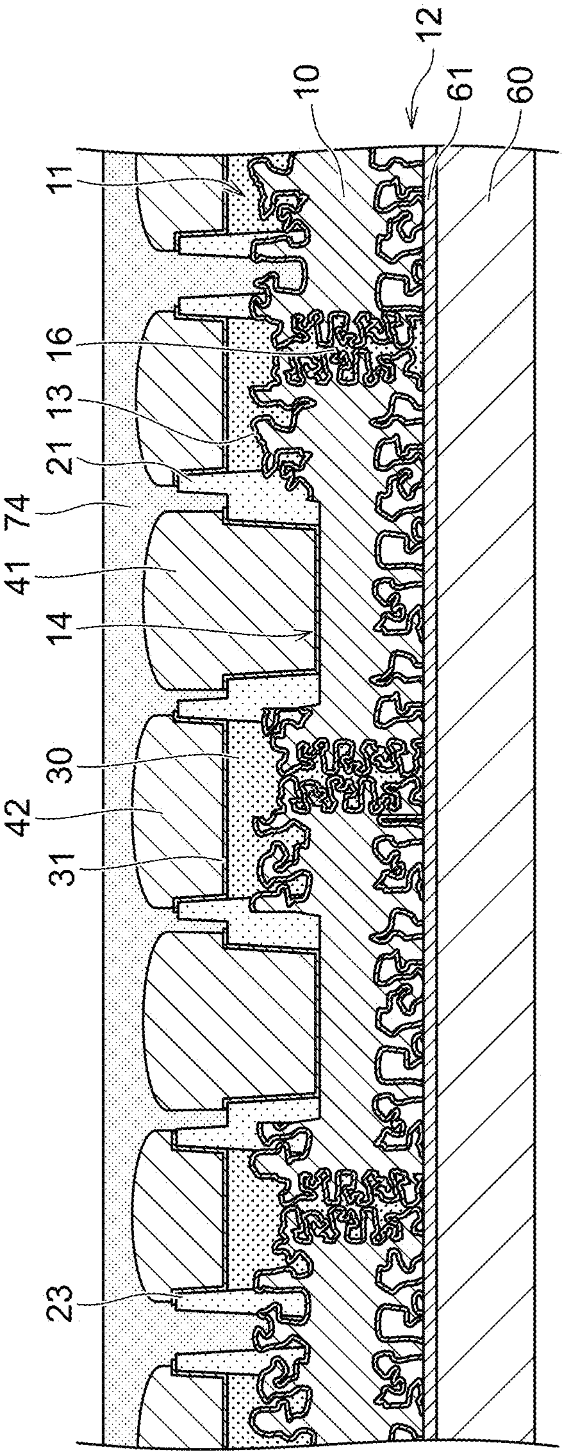
Figure 21B:
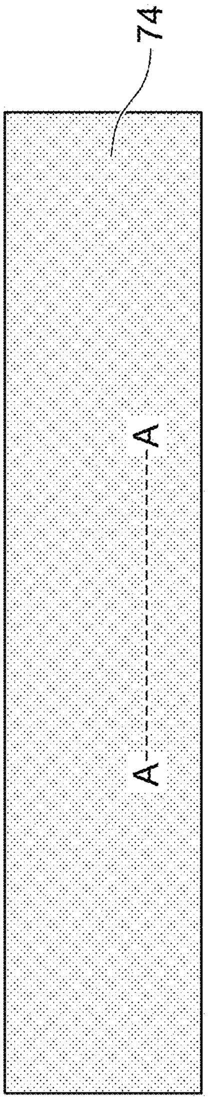
Figure 22A:
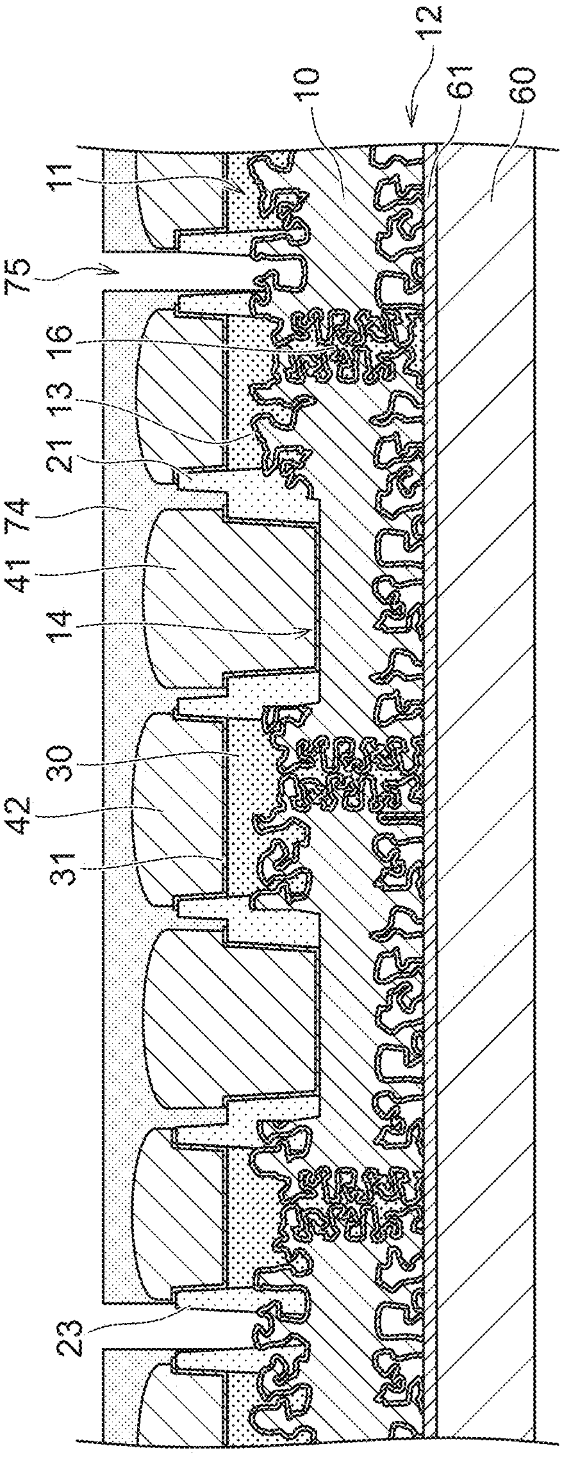
Figure 22B:
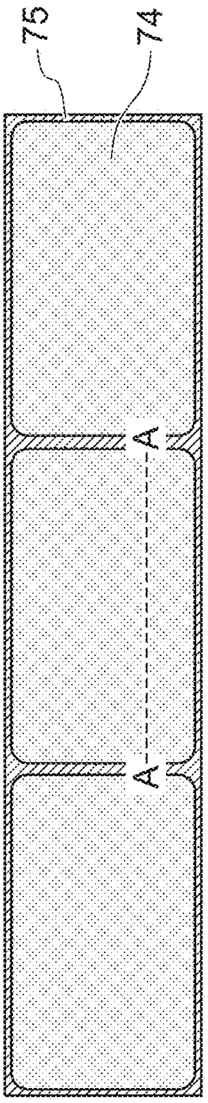
Figure 23A:
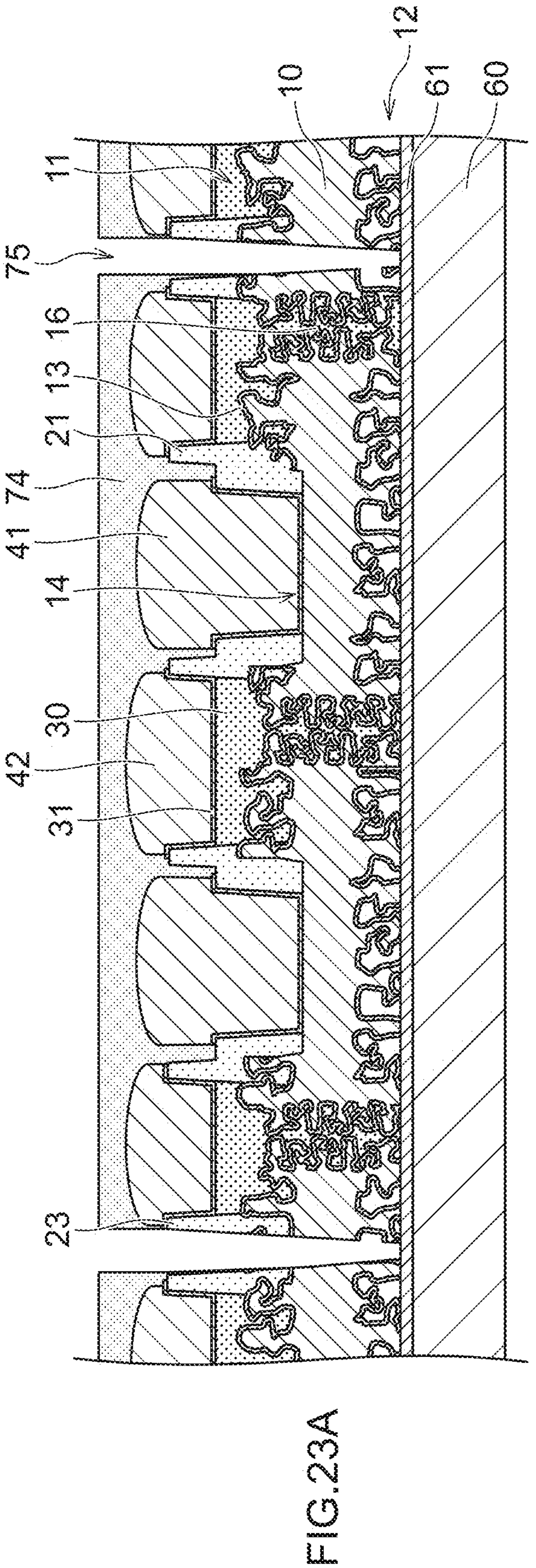
Figure 23B:
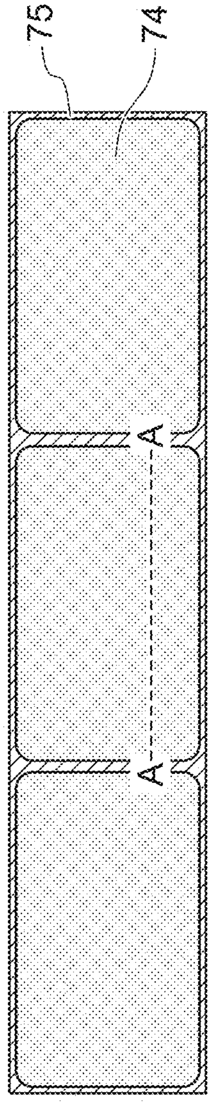
Figure 24A:
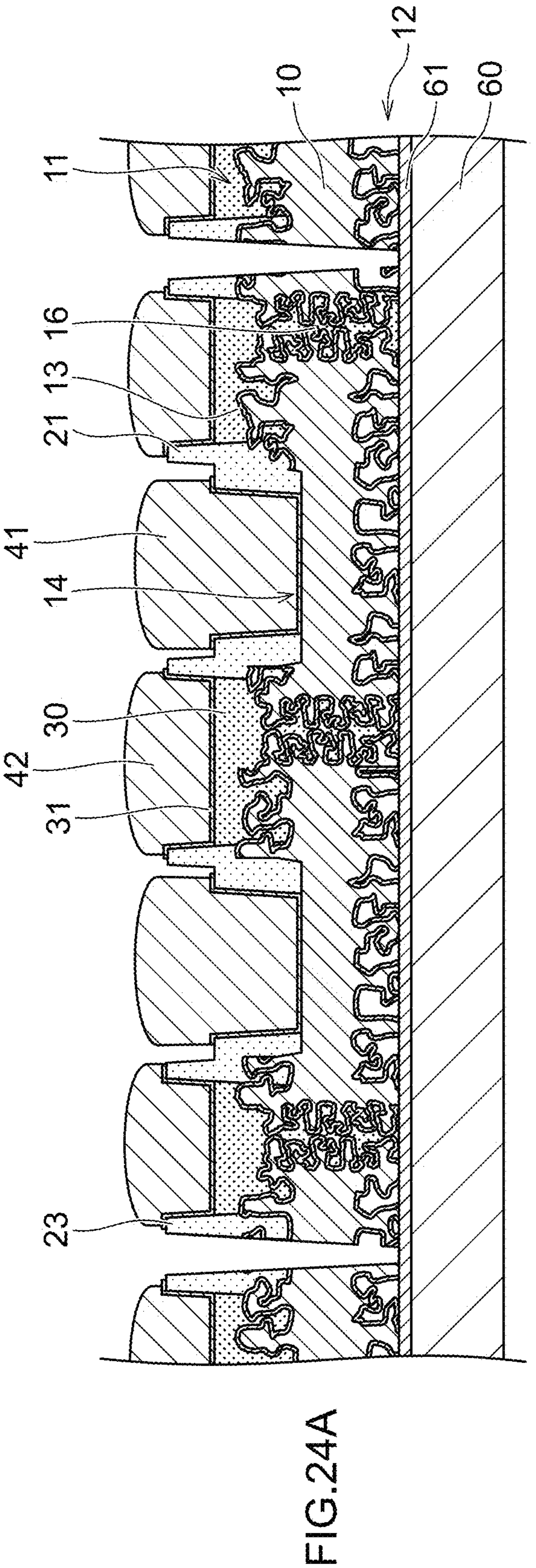
Figure 24B:
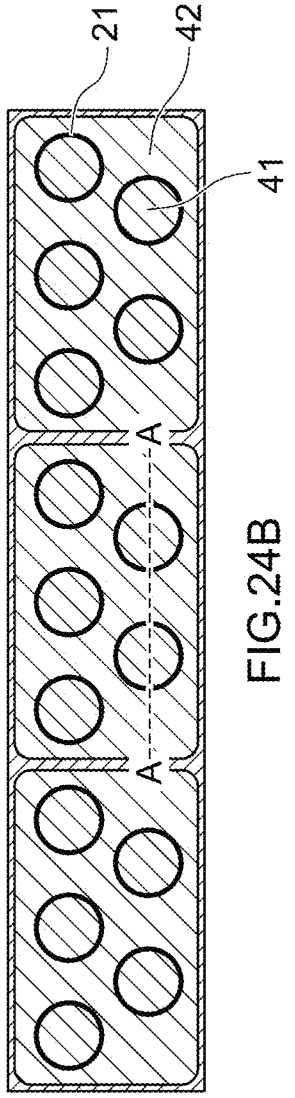

Then, after removing the resist 73 by ashing or the like (FIGS. 19A and 19B), an unnecessary part of the seed layer is removed (FIGS. 20A and 20B). Then, a photosensitive liquid resist 74 is applied onto the entire surface on the main surface 11 side (FIGS. 21A and 22B, followed by exposure and development, to form an opening 75 in the resist 74 (FIGS. 22A and 22B). Subsequently, the dielectric film 13 and metal foil 10 are etched using the resist 74 as a mask to singulate the metal foil 10 (FIGS. 23A and 23B).

Figure 25A:
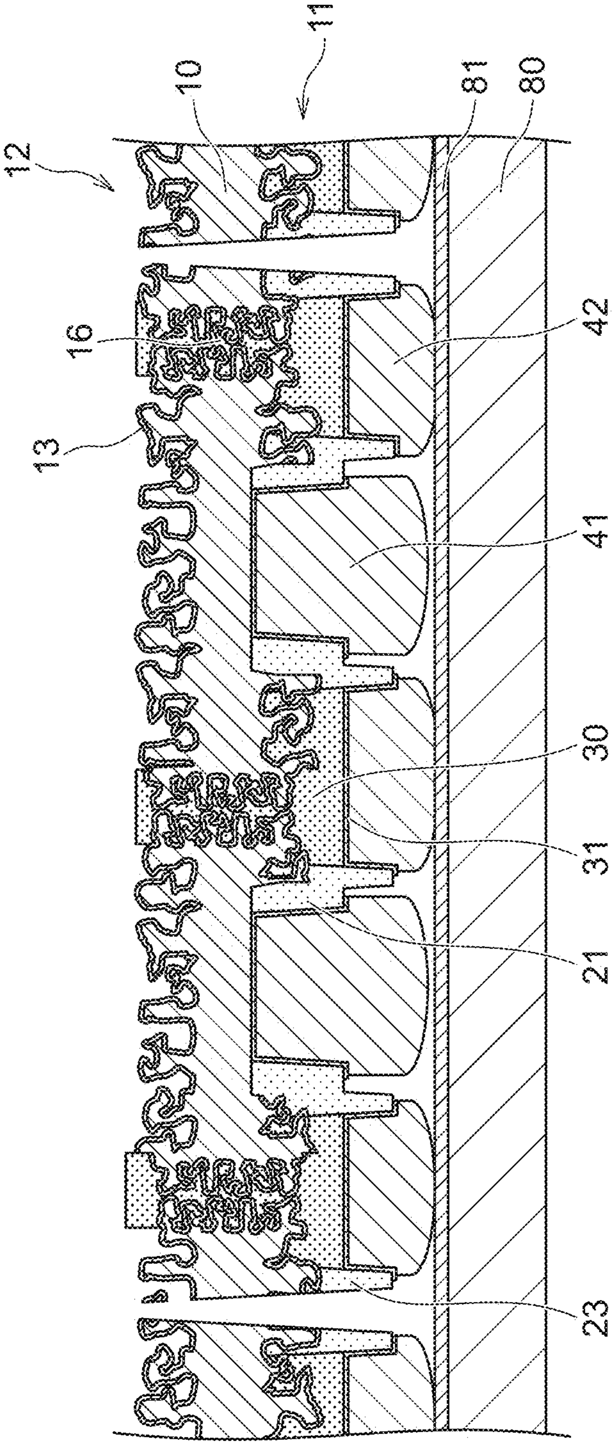
Figure 25B:
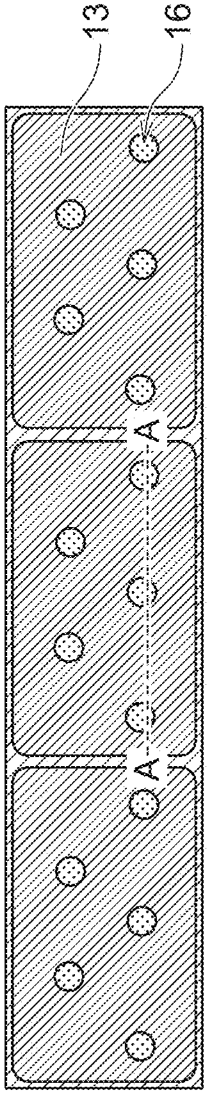
Figure 26A:
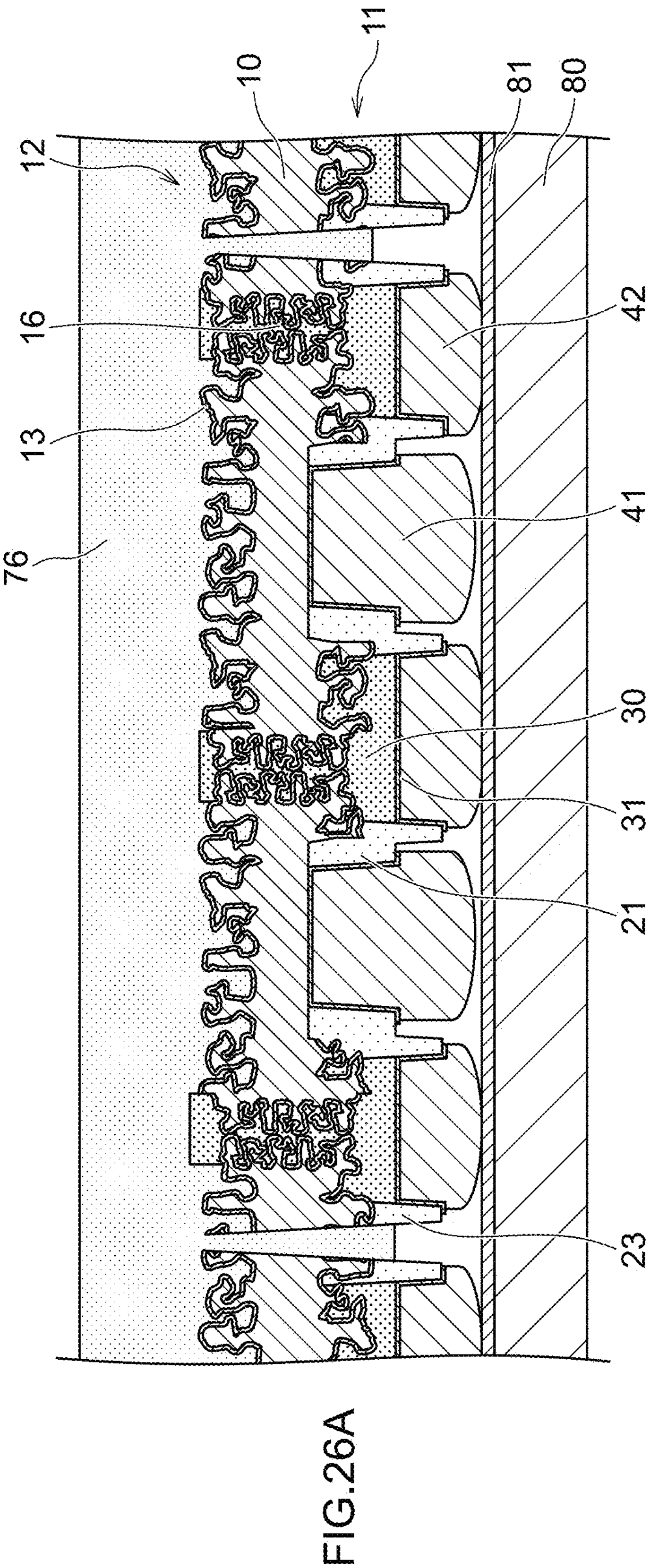
Figure 26B:
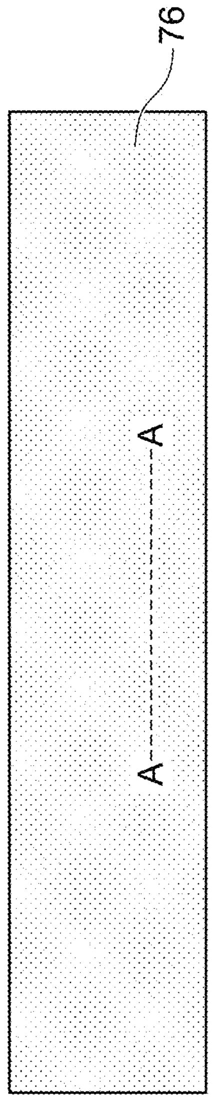
Figure 27A:
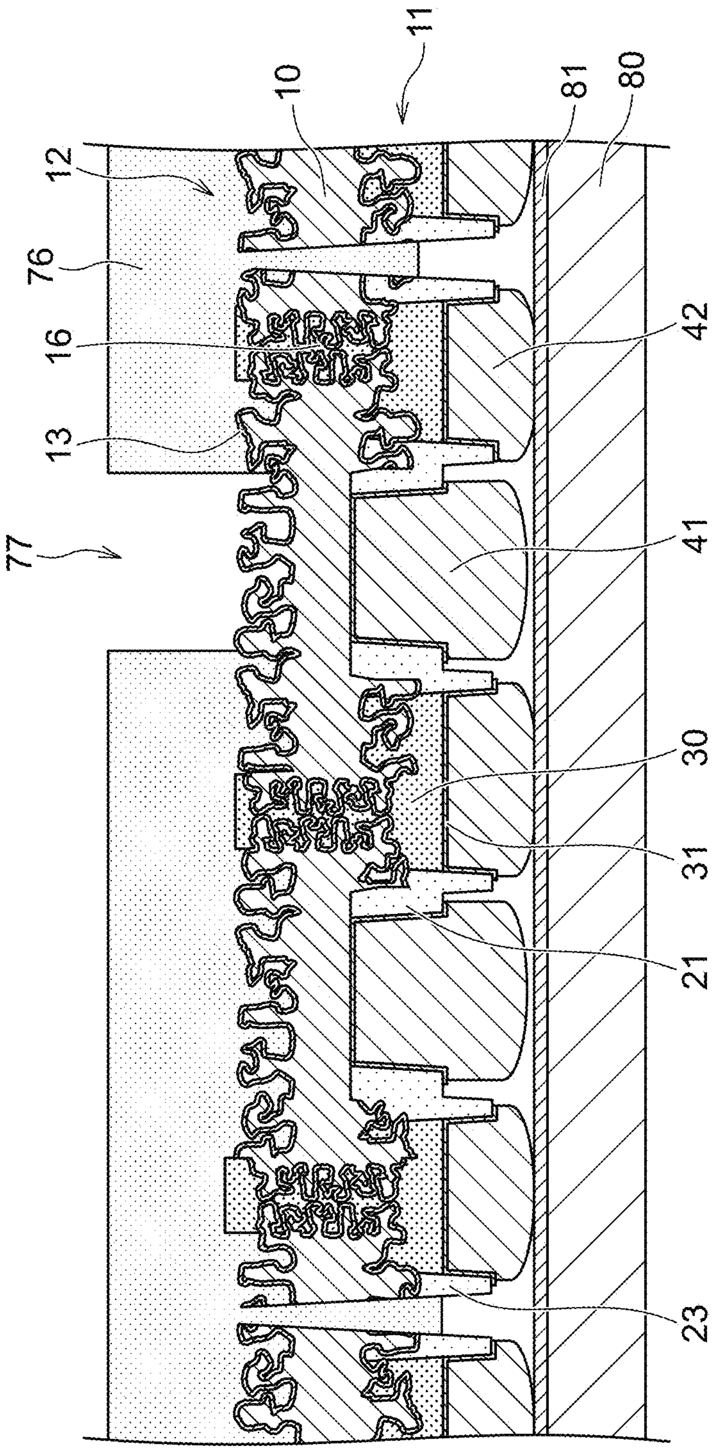
Figure 27B:
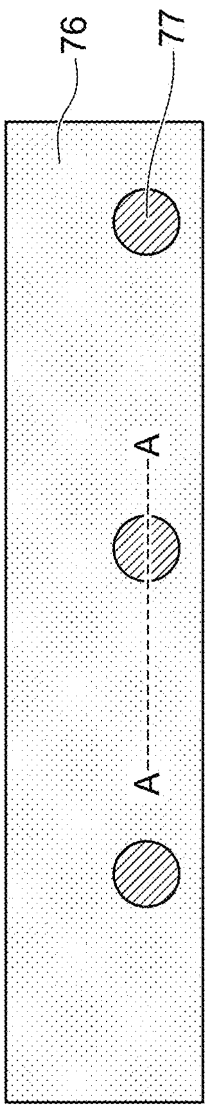
Figure 28A:
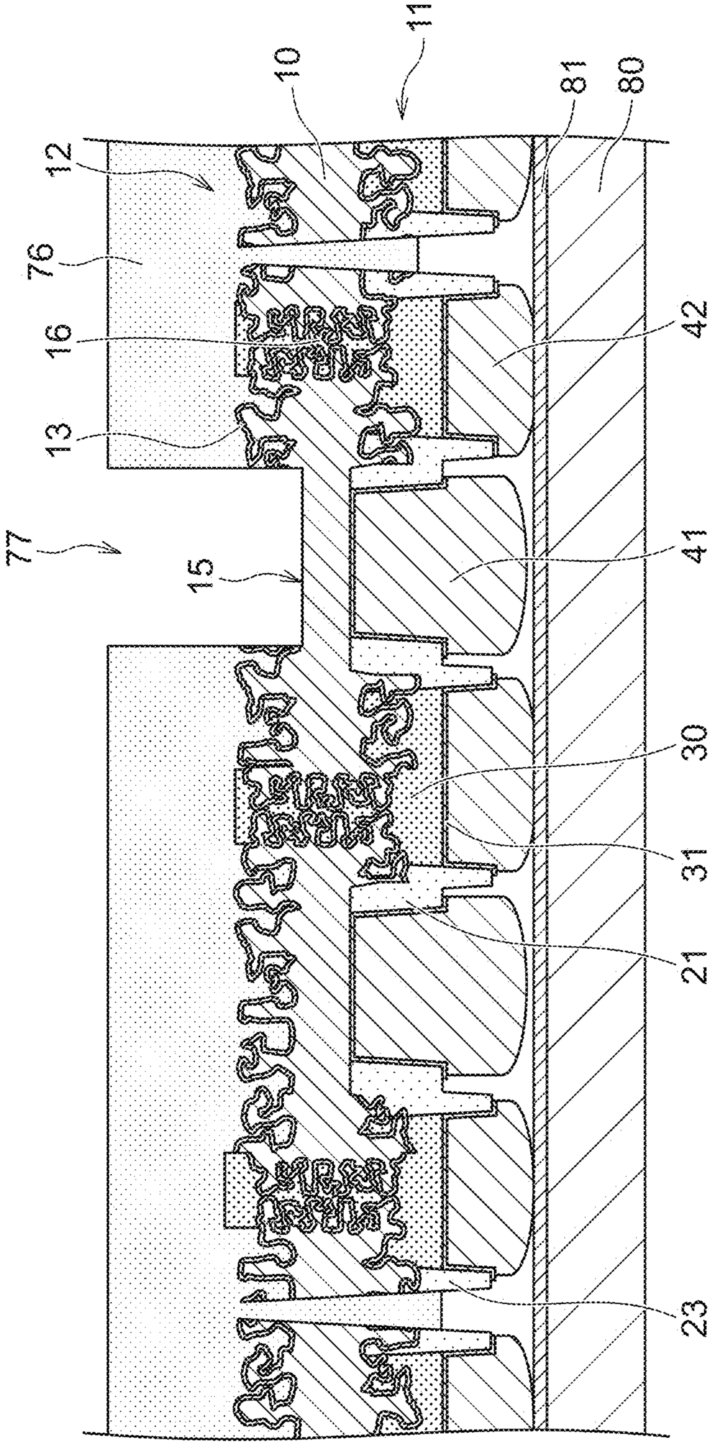
Figure 28B:
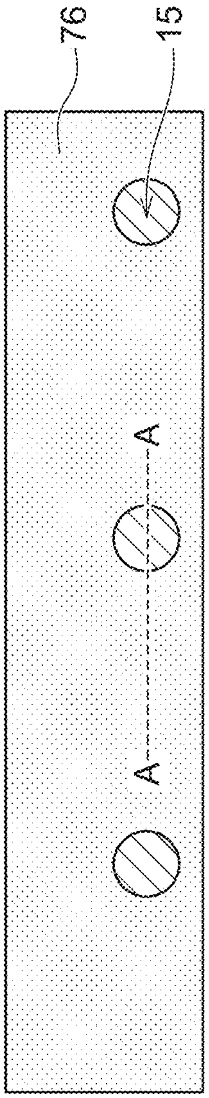
Figure 29A:
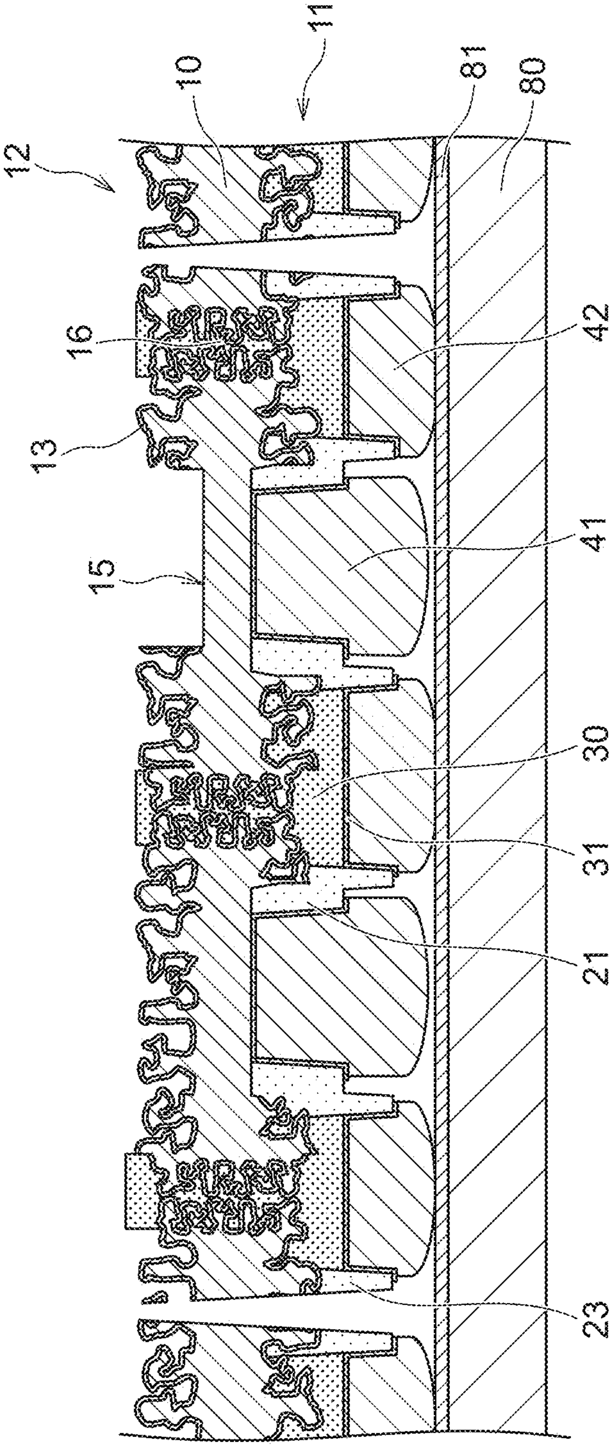
Figure 29B:
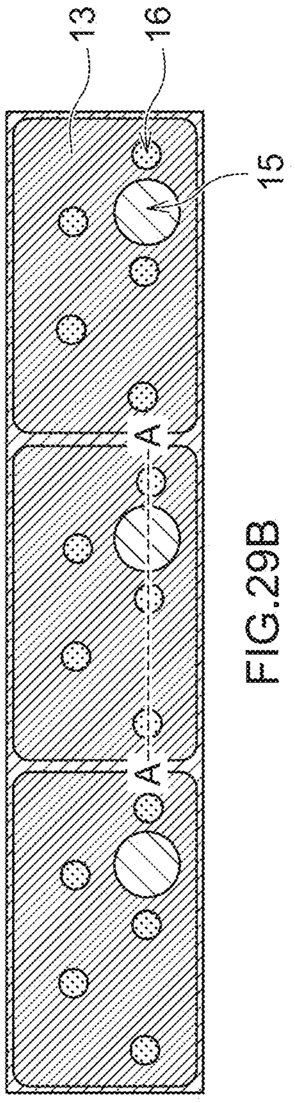
Figure 30A:
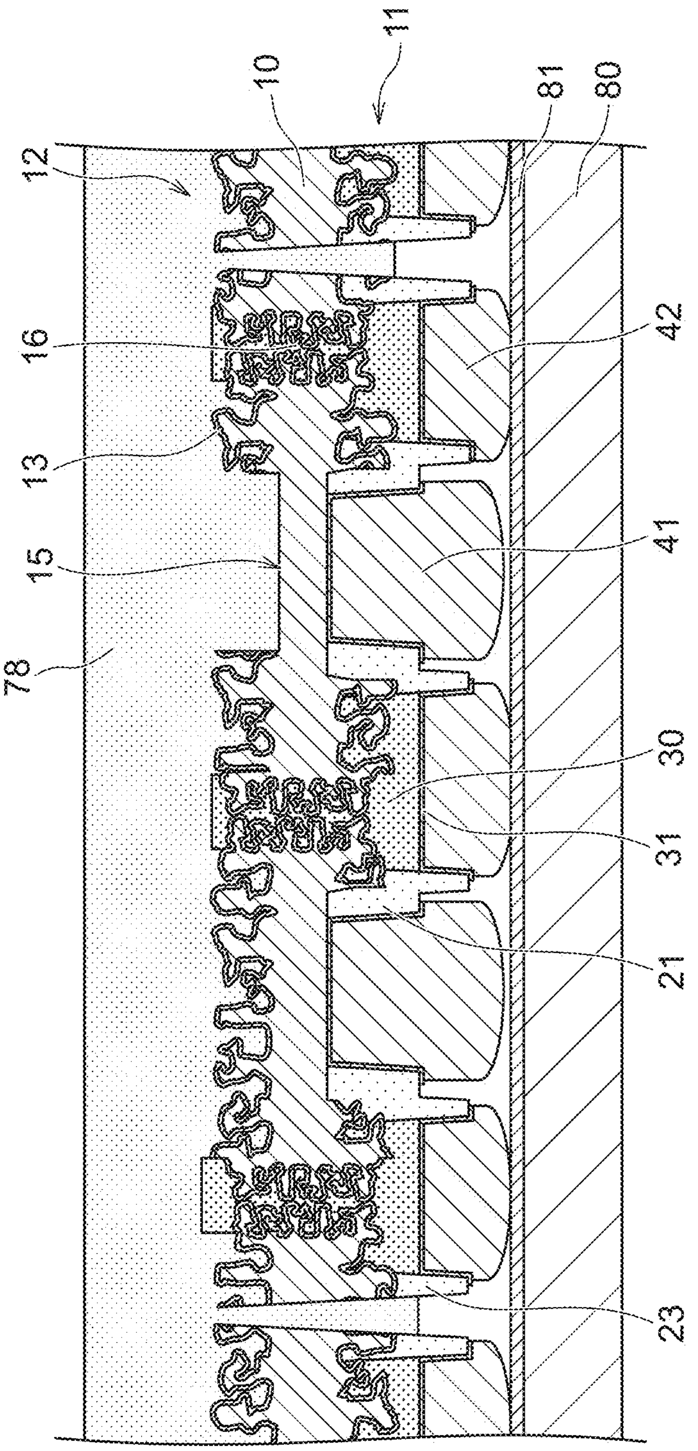
Figure 30B:
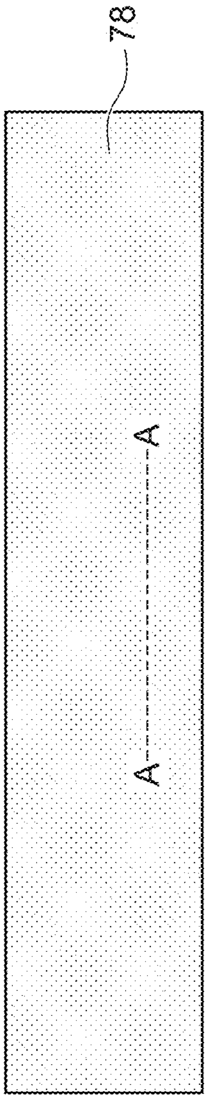

Then, after removing the resist 74 (FIGS. 24A and 24B), another support substrate 80 is stuck to the metal terminals 41 and 42 side through another adhesive layer 81, followed by peeling of the adhesive layer 61 and support substrate 60 on the main surface 12 side (FIGS. 25A and 25B). Then, a photosensitive liquid resist 76 is formed on the main surface 12 side of the metal foil 10 (FIGS. 26A and 26B), followed by exposure and development, to form an opening 77 in the resist 76 (FIGS. 27A and 27B). Subsequently, the dielectric film 13 and metal foil 10 are etched using the resist 76 as a mask to form the groove 15 in the metal foil 10 (FIGS. 28A and 28B). The depth of the groove 15 is set equal to or more than the thickness of the porous layer 12*a* illustrated in FIG. 6A. As a result, the non-porous layer 10*a* as the center portion of the metal foil 10 is exposed in the bottom of the groove 15.

Figure 31A:
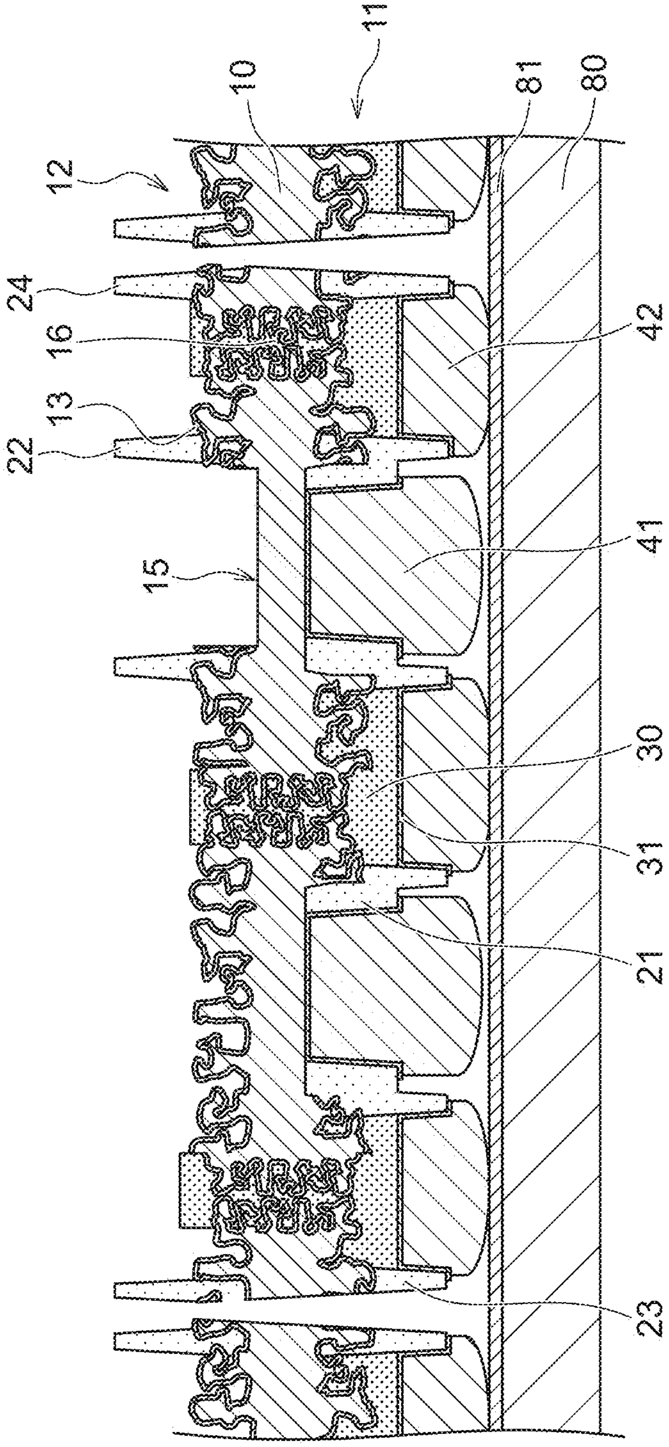
Figure 31B:
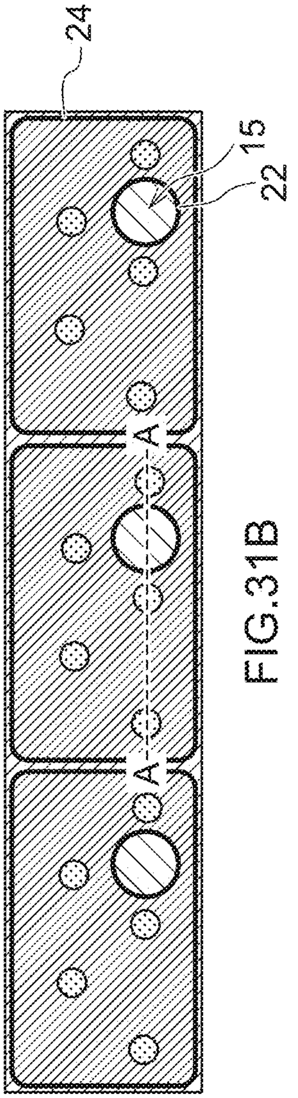
Figure 32A:
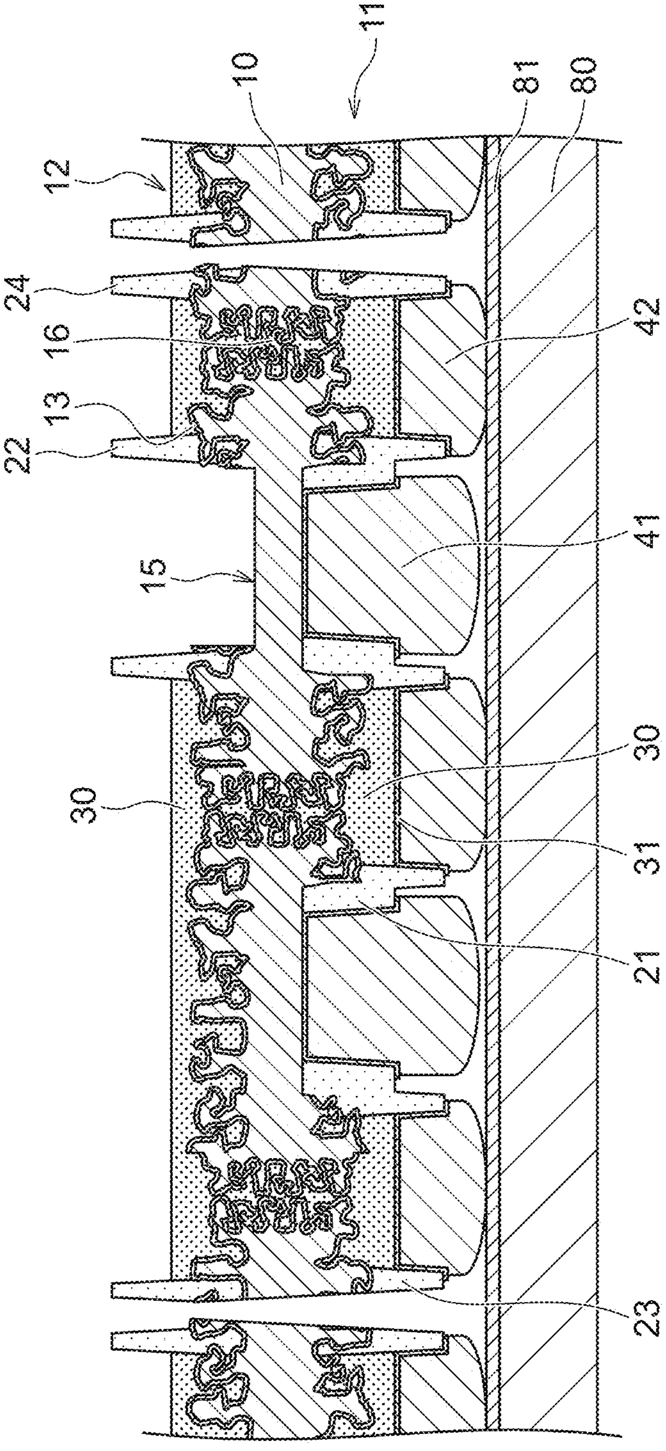
Figure 32B:
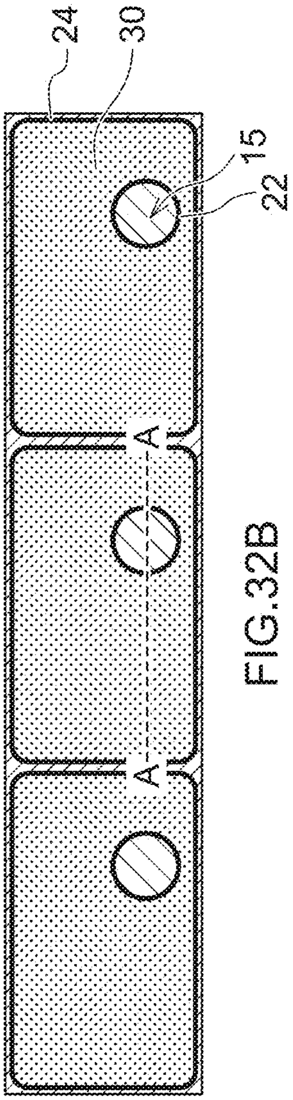

Subsequently, after removal of the resist 76 (FIGS. 29A and 29B), a photosensitive insulating resin 78 is formed on the main surface 12 of the metal foil 10 (FIGS. 30A and 30B), followed by exposure and development, to pattern the insulating resin 78 (FIGS. 31A and 31B). As a result, the ring-shaped insulating resins 22 and 24 are formed on the main surface 12 of the metal foil 10. The inner peripheral wall of the ring-shaped insulating resin 22 is preferably positioned inside the groove 15 formed in the metal foil 10. The outer peripheral wall of the ring-shaped insulating resin 22 needs to be positioned outside the groove 15 formed in the metal foil 10. Then, the conductive polymer layer 30 is formed outside a region surrounded by the insulating resin 22 but inside a region surrounded by the insulating resin 24 (FIGS. 32A and 32B). As a result, the conductive polymer layer 30 formed on the main surface 12 side and the conductive polymer layer 30 formed inside the through hole 16 are unified. On the other hand, the conductive polymer layer 30 is not formed in a region surrounded by the insulating resin 22 and outside a region surrounded by the insulating resin 24.

Figure 33A:
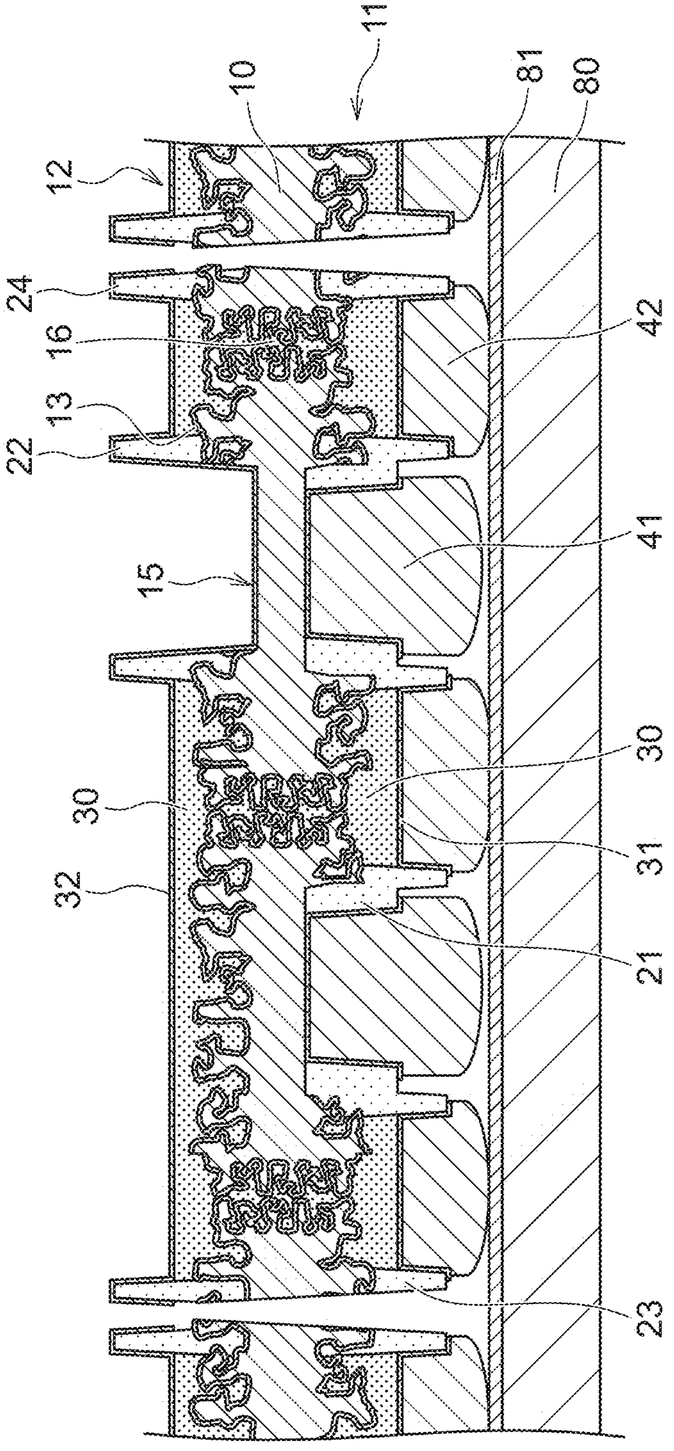
Figure 33B:
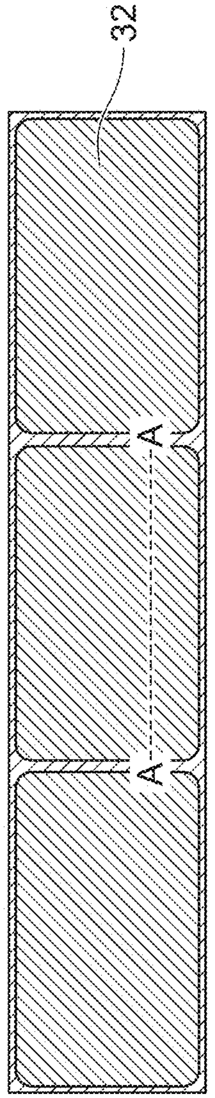
Figure 34A:
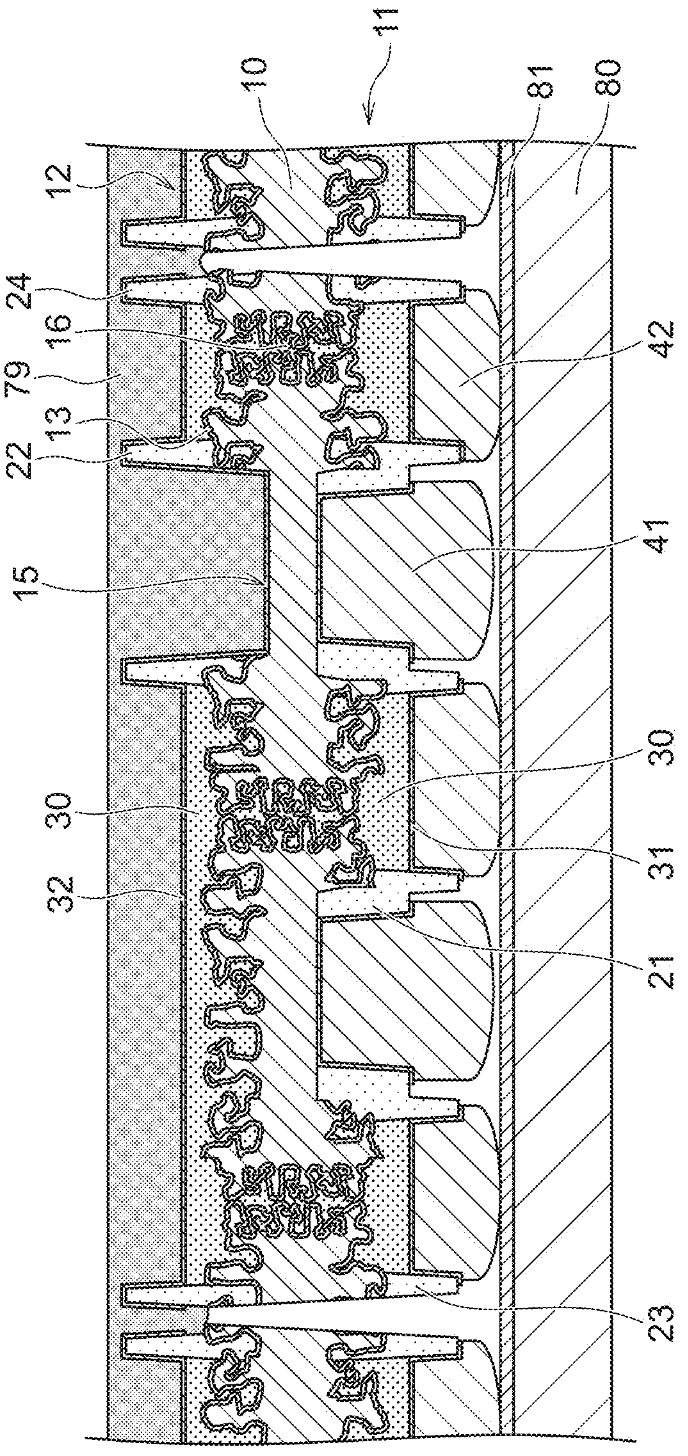
Figure 34B:
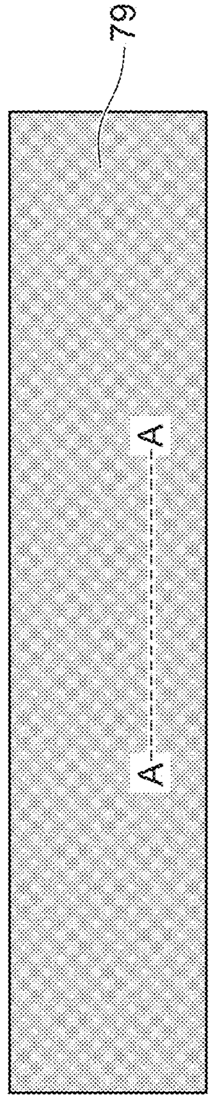
Figure 35A:
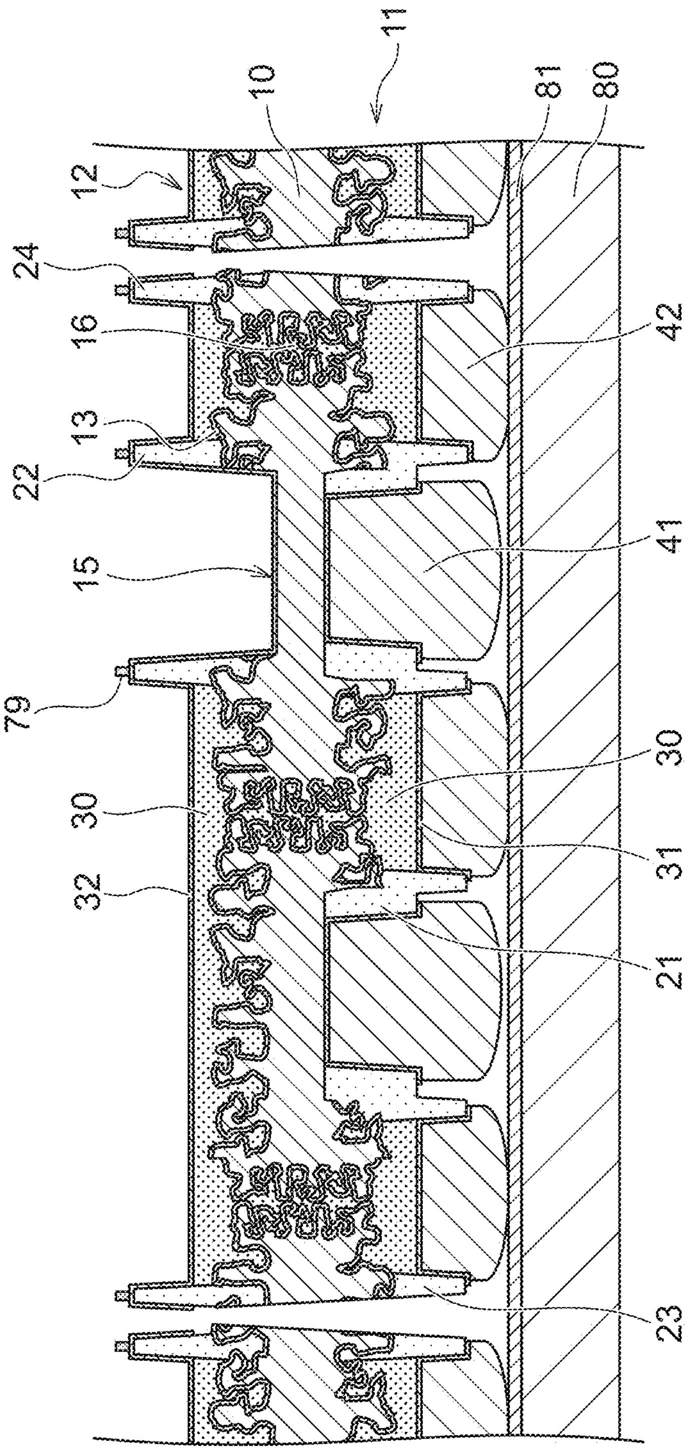
Figure 35B:
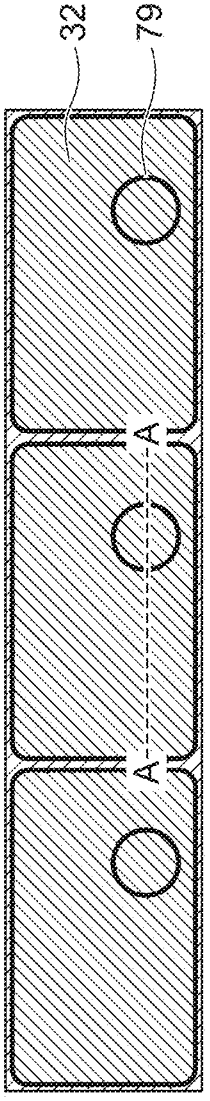
Figure 36A:
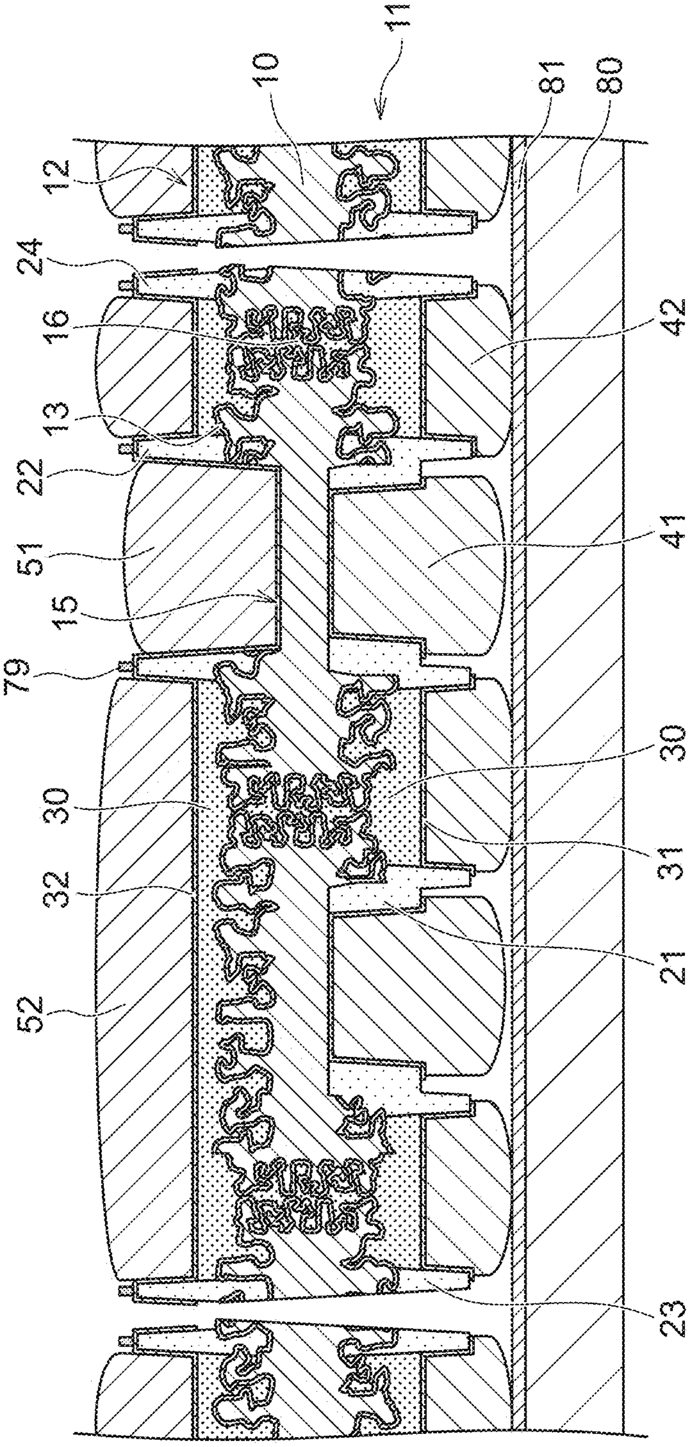
Figure 36B:
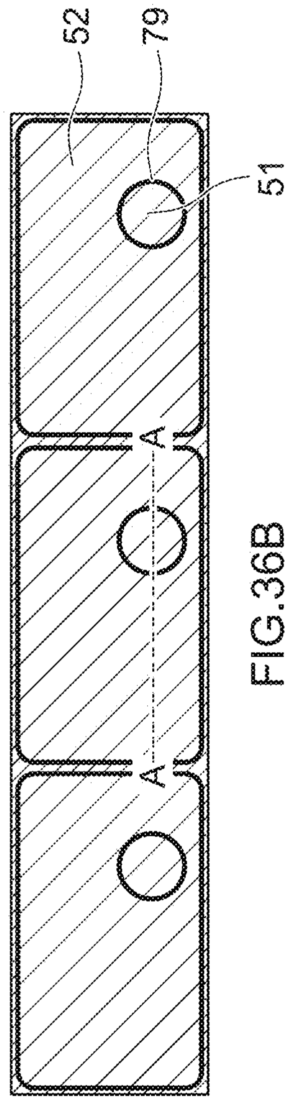
Figure 37A:
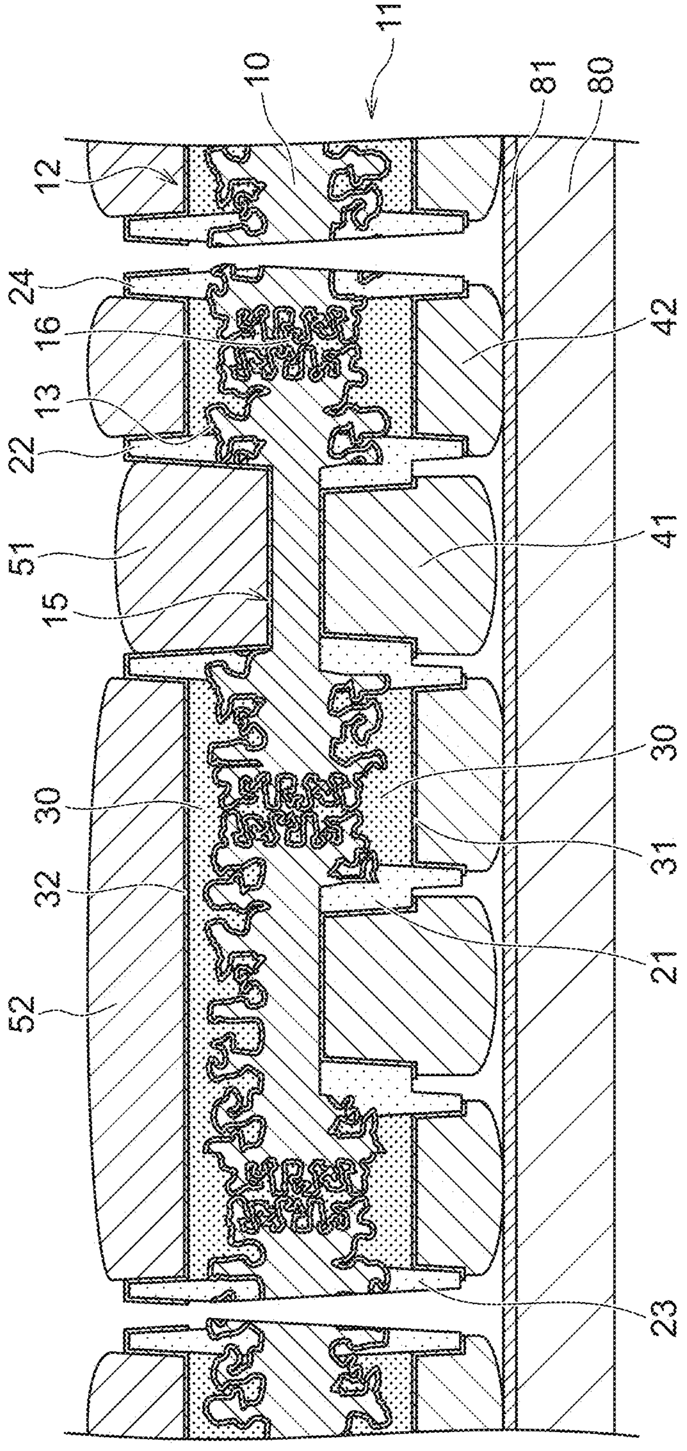
Figure 37B:
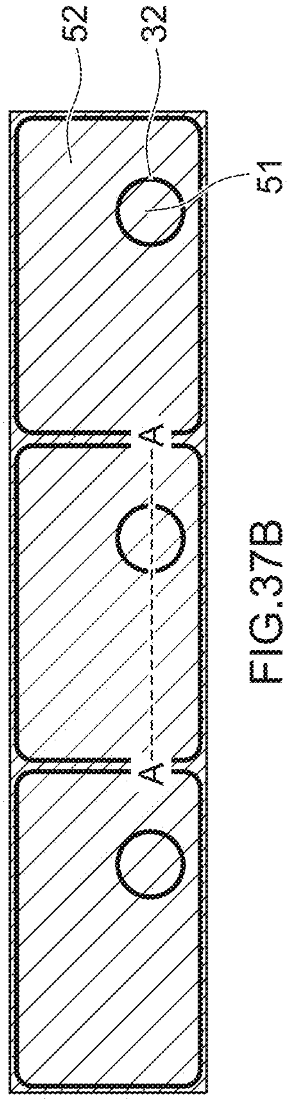

Subsequently, the seed layer 32 is formed on the entire surface on the main surface 12 side using a sputtering method or the like (FIGS. 33A and 33B). Before the seed layer 32 is formed, a residue remaining on the surface may be removed by reverse sputtering. Then, a photosensitive liquid resist 79 is applied onto the entire surface (FIGS. 34A and 34B), followed by exposure and development, to pattern the resist 79 (FIGS. 35A and 35B). As a result, the seed layer 32 on which the metal terminals 51 and 52 are to be formed is exposed. Then, electrolytic plating is performed to form the metal terminals 51 and 52 (FIGS. 36A and 36B), whereby the metal terminal 51 is connected to the metal foil 10, and the metal terminal 52 is connected to the conductive polymer layer 30 covering the dielectric film 13.

Figure 38A:
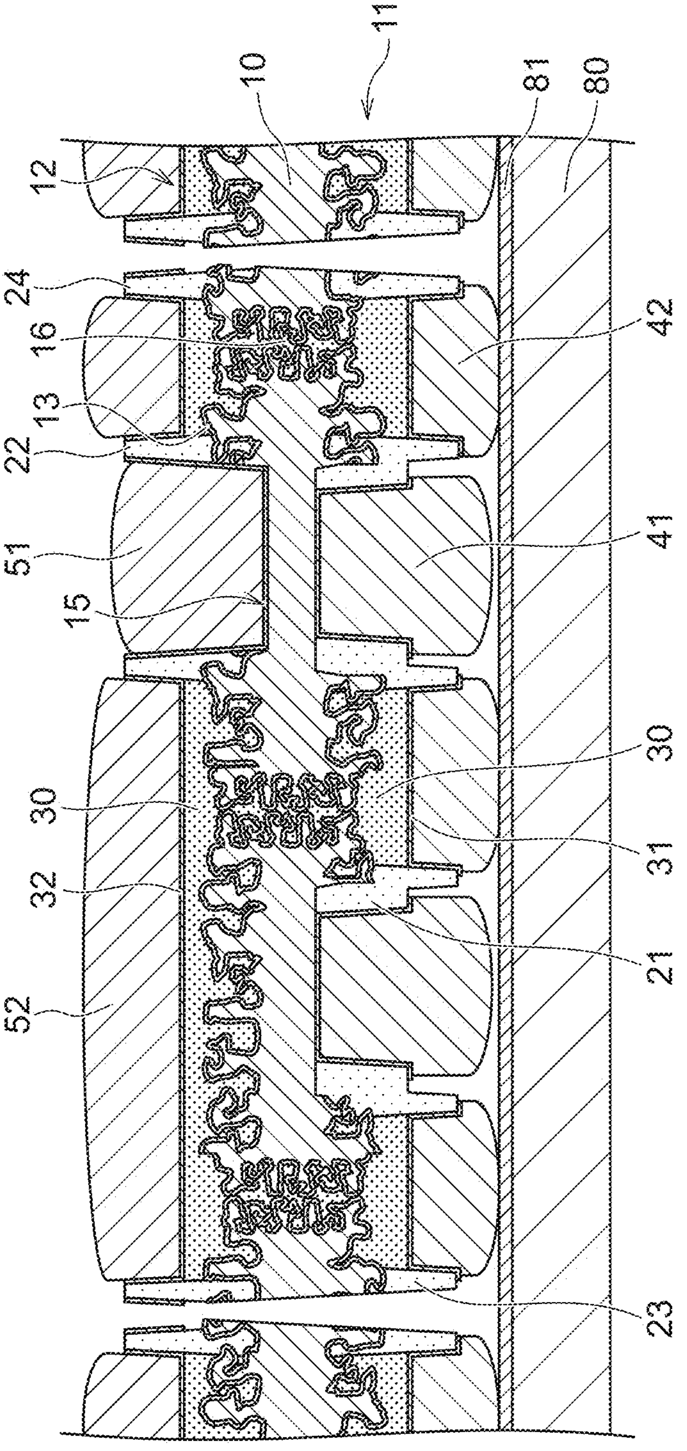
Figure 38B:
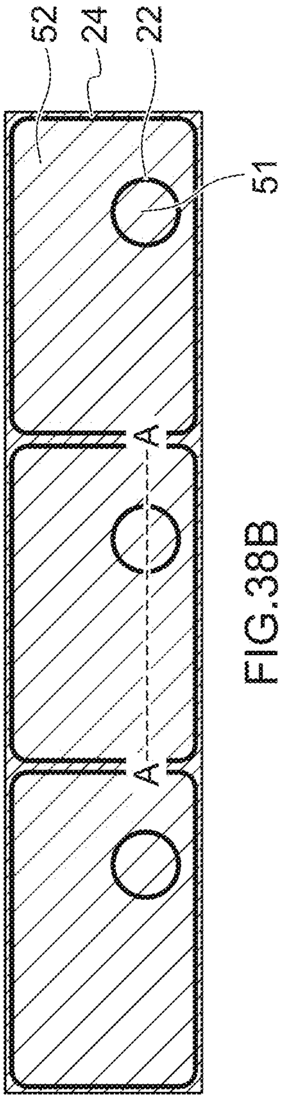

Subsequently, after removing the resist 79 by ashing or the like (FIGS. 37A and 37B), an unnecessary part of the seed layer is removed (FIGS. 38A and 38B). Then, the support substrate 80 and adhesive layer 81 are removed, whereby the thin film capacitor 1 illustrated in FIGS. 1A and 1B is completed.

Figure 39:
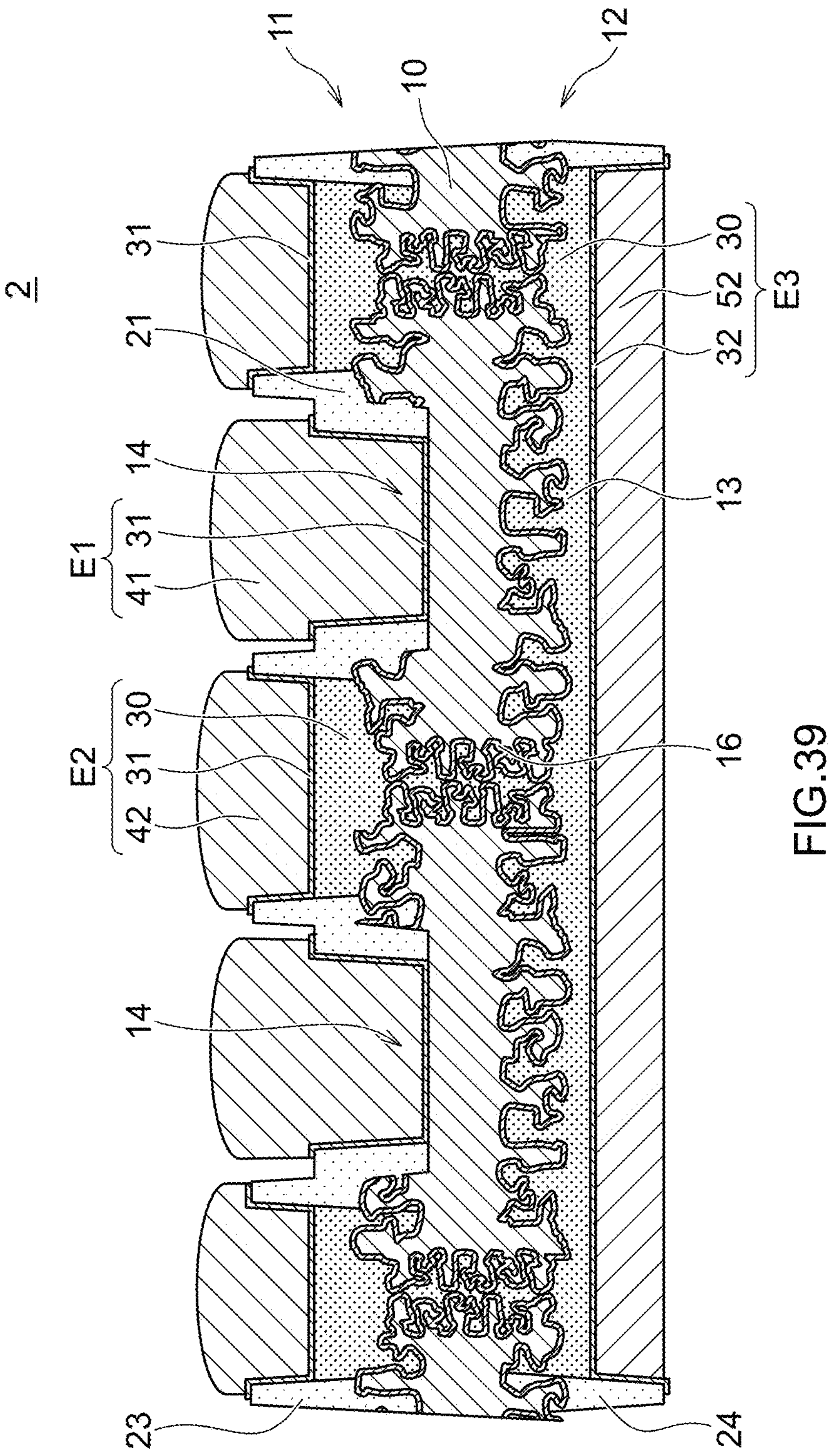
FIG. 39 is a schematic cross-sectional view for explaining the structure of a thin film capacitor 2 according to a second embodiment of the present disclosure.

FIG. 39 is a schematic cross-sectional view for explaining the structure of a thin film capacitor 2 according to a second embodiment of the technology described herein.

As illustrated in FIG. 39, the thin film capacitor 2 according to the second embodiment differs from the thin film capacitor 1 according to the first embodiment in that the metal terminal 52 is formed on the entire surface on the main surface 12 side of the metal foil 10. Thus, the electrode layer E4 does not exist, and the main surface 12 of the metal foil 10 is entirely covered with the conductive polymer layer 30. Other basic configurations are the same as those of the thin film capacitor 1 according to the first embodiment, so the same reference numerals are given to the same elements, and overlapping description will be omitted. As in the thin film capacitor 2 according to the second embodiment, the electrode layer E4 need not necessarily be provided on the main surface 12 side of the metal foil 10, and the metal terminal 52 may be provided on the entire surface on the main surface 12 side.

Figure 40:
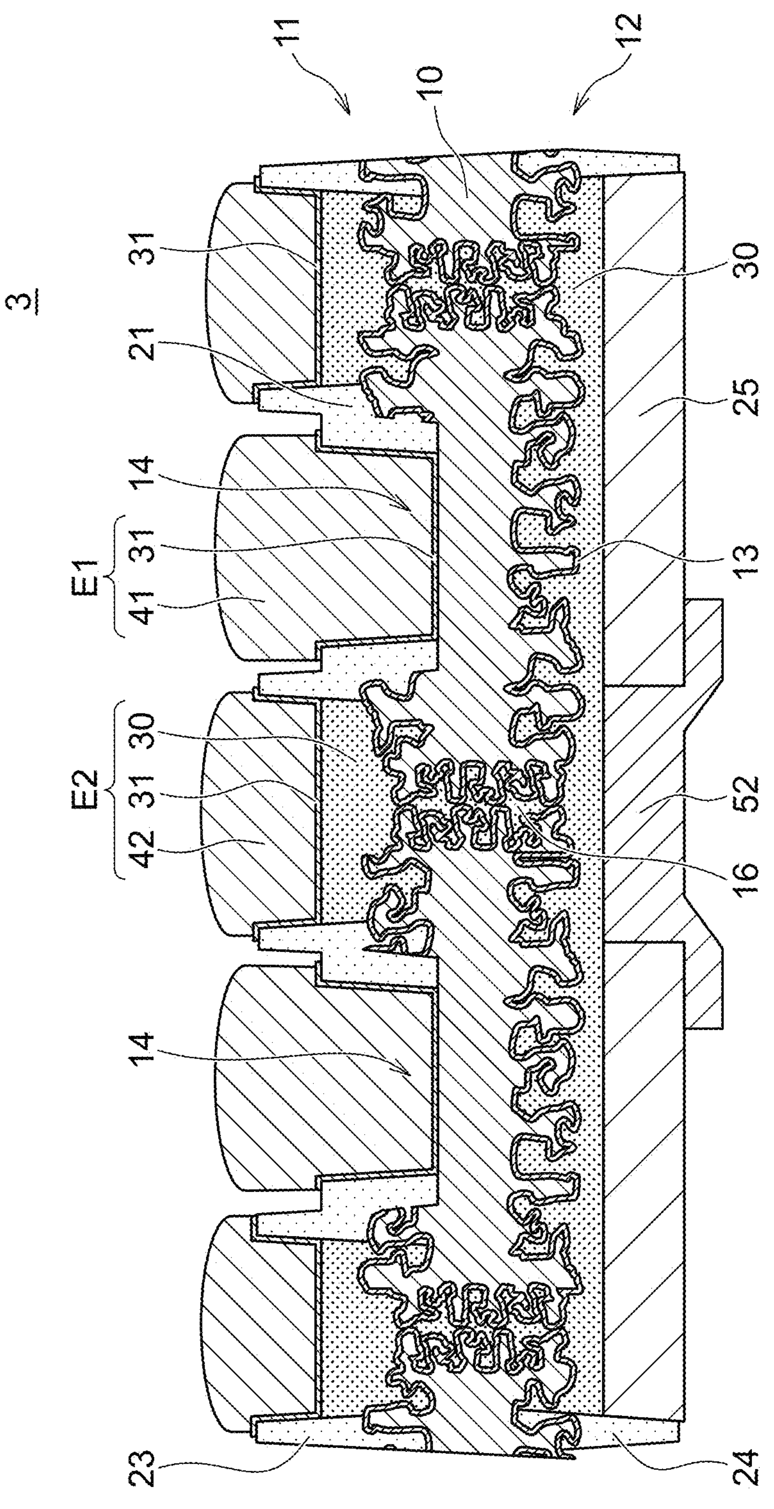
FIG. 40 is a schematic cross-sectional view for explaining the structure of a thin film capacitor 3 according to a third embodiment of the present disclosure.

FIG. 40 is a schematic cross-sectional view for explaining the structure of a thin film capacitor 3 according to a third embodiment of the technology described herein.

As illustrated in FIG. 40, the thin film capacitor 3 according to the third embodiment differs from the thin film capacitor 2 according to the second embodiment in that the conductive polymer layer 30 provided on the main surface 12 side of the metal foil 10 is covered with an insulating resin 25, and the metal terminal 52 is connected to the conductive polymer layer 30 through an opening formed in the insulating resin 25. The metal terminal 52 is partially positioned on the surface of the insulating resin 25. Other basic configurations are the same as those of the thin film capacitor 2 according to the second embodiment, so the same reference numerals are given to the same elements, and overlapping description will be omitted. As in the thin film capacitor 3 according to the third embodiment, there may be provided the insulating resin 25 that covers the conductive polymer layer 30 provided on the main surface 12 side of the metal foil 10.

Figure 41:
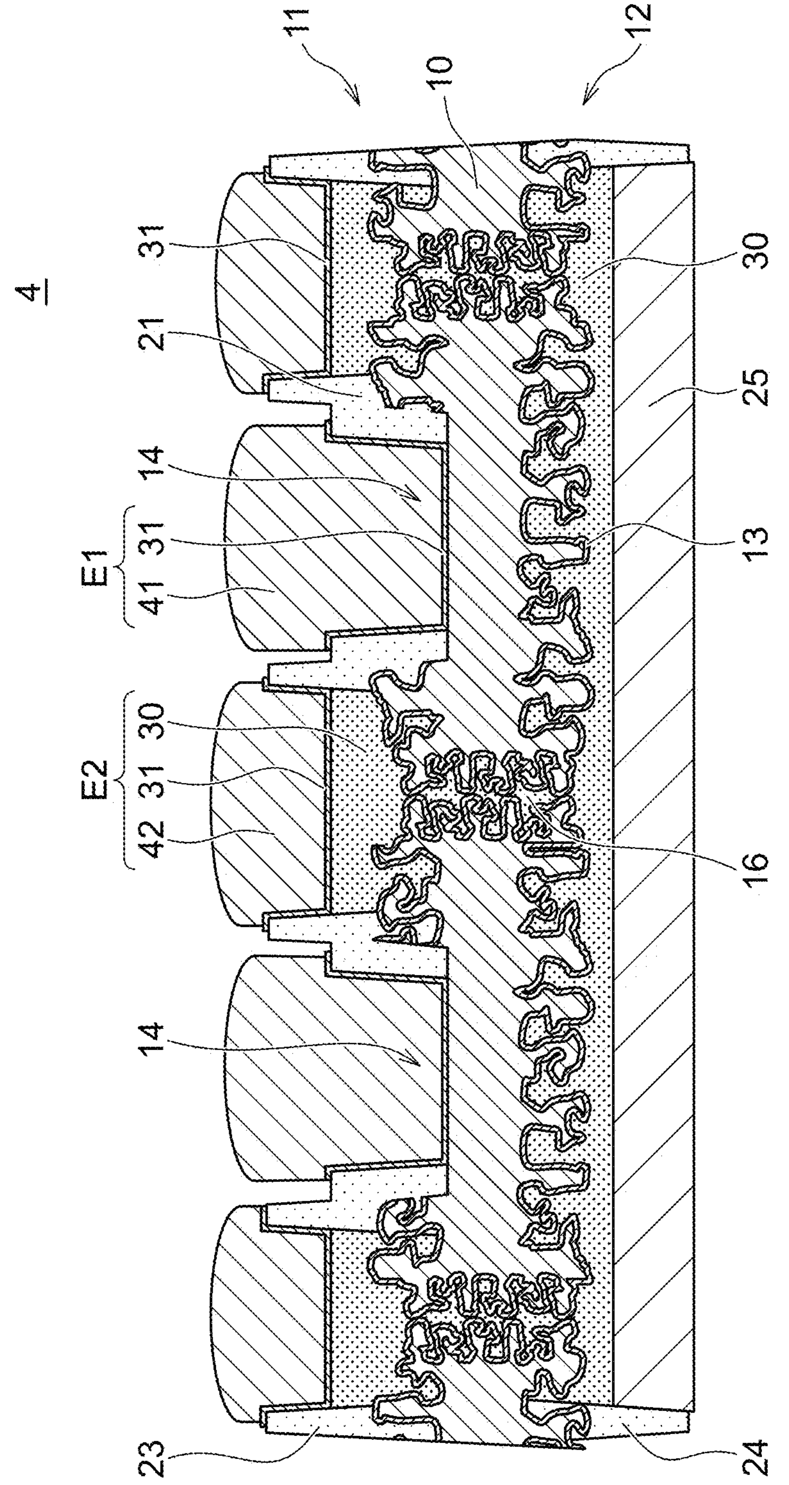
FIG. 41 is a schematic cross-sectional view for explaining the structure of a thin film capacitor 4 according to a third embodiment of the present disclosure.

FIG. 41 is a schematic cross-sectional view for explaining the structure of a thin film capacitor 4 according to a fourth embodiment of the technology described herein.

As illustrated in FIG. 41, the thin film capacitor 4 according to the fourth embodiment differs from the thin film capacitor 3 according to the third embodiment in that the insulating resin 25 does not have an opening, and the entire surface of the conductive polymer layer 30 is covered with the insulating resin 25. Other basic configurations are the same as those of the thin film capacitor 3 according to the third embodiment, so the same reference numerals are given to the same elements, and overlapping description will be omitted. As in the thin film capacitor 4 according to the fourth embodiment, a metal terminal need not necessarily be provided on the main surface 12 side of the metal foil 10.

Figure 42:
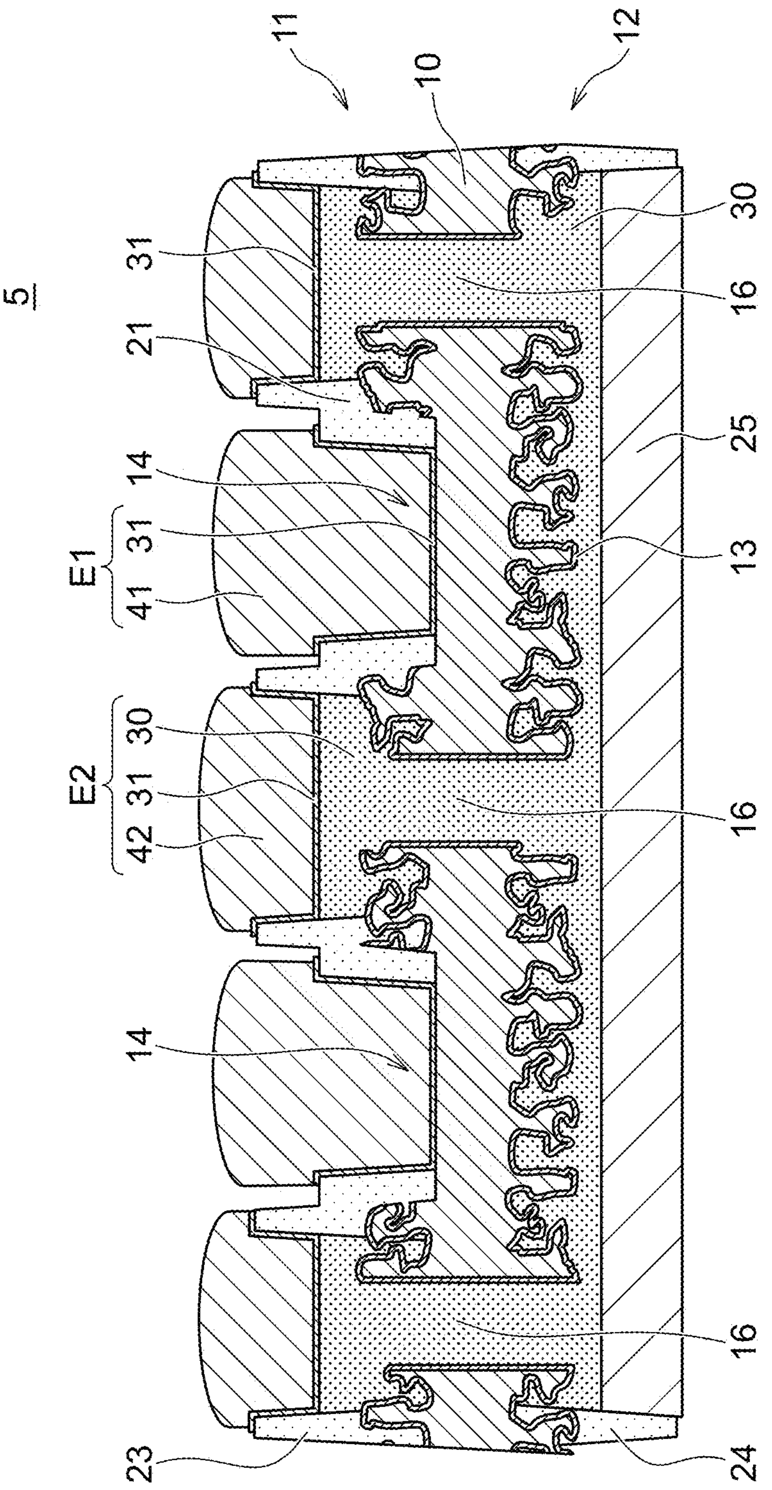
FIG. 42 is a schematic cross-sectional view for explaining the structure of a thin film capacitor 5 according to a third embodiment of the present disclosure.

FIG. 42 is a schematic cross-sectional view for explaining the structure of a thin film capacitor 5 according to a fifth embodiment of the technology described herein.

Figure 43A:
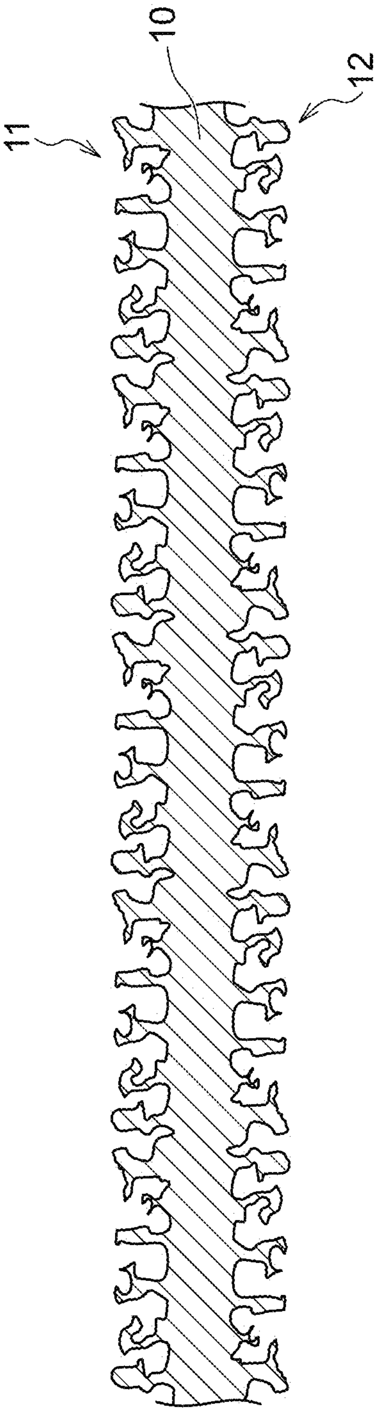
FIGS. 43A to 43C are schematic cross-sectional views for explaining a manufacturing process of the thin film capacitor 5.
Figure 43B:
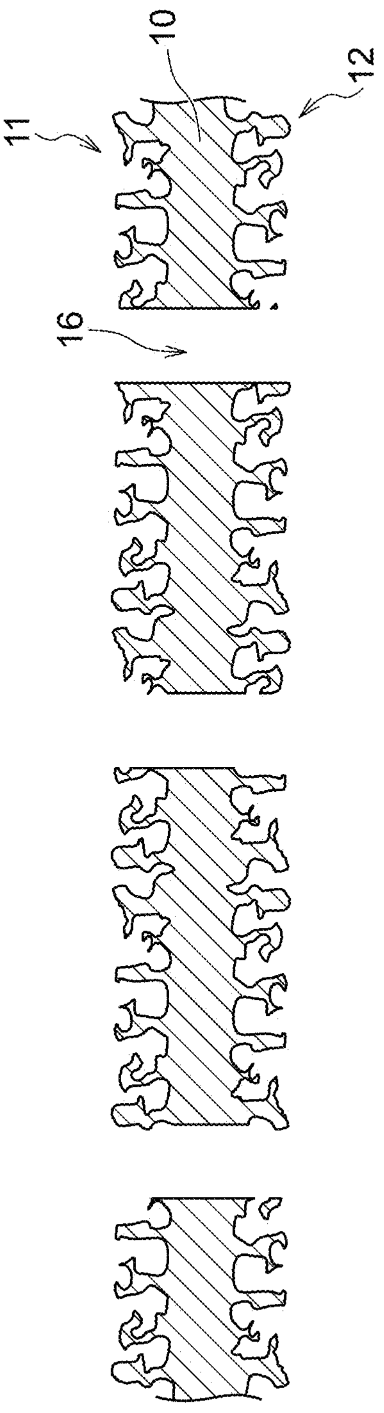
Figure 43C:
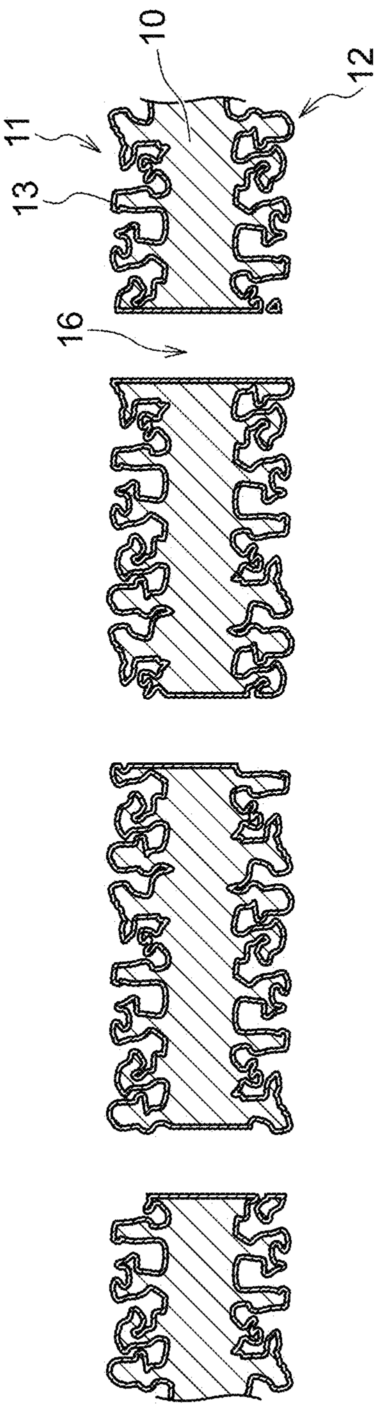

As illustrated in FIG. 42, the thin film capacitor 5 according to the fifth embodiment differs from the thin film capacitor 4 according to the fourth embodiment in that the inner wall of the through hole 16 is not roughened. Other basic configurations are the same as those of the thin film capacitor 4 according to the fourth embodiment, so the same reference numerals are given to the same elements, and overlapping description will be omitted. To form the thus configured through hole 16, the main surfaces 11 and 12 are roughened by etching (FIG. 43A) without forming the recesses 17 and 18 in the metal foil 10 illustrated in FIGS. 2Aa and 2B, followed by formation of the plurality of through holes 16 (FIG. 43B). A formation method for the through hole 16 is not particularly limited. For example, the through hole 16 may be formed by dry etching or wet etching through a resist, or by laser machining. Then, the dielectric film 13 is formed after formation of the plurality of through holes 16, allowing the inner walls of the through holes 16 to be covered with the dielectric film 13 (FIG. 43C).

Figure 44:
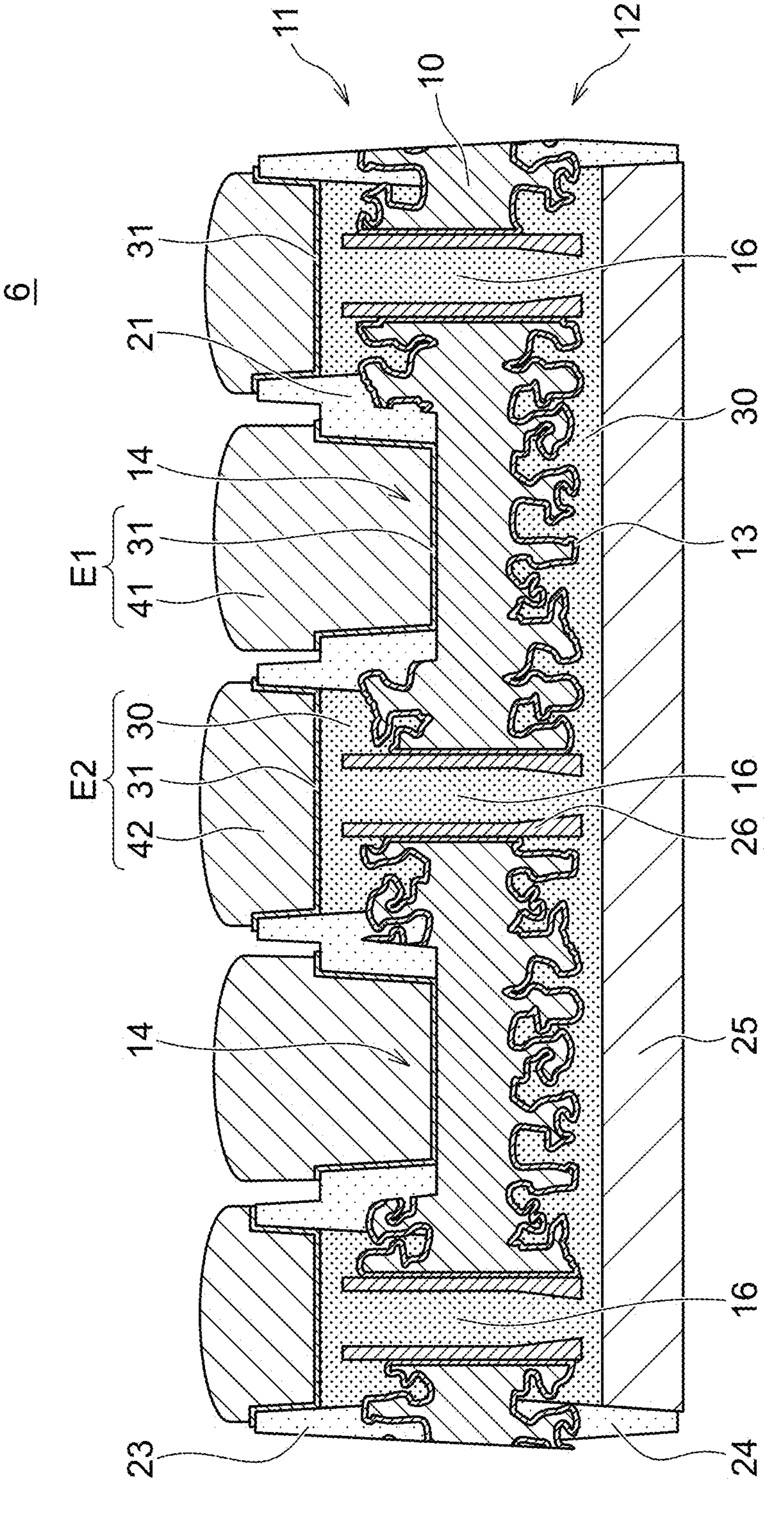
FIG. 44 is a schematic cross-sectional view for explaining the structure of a thin film capacitor 6 according to a third embodiment of the present disclosure.

FIG. 44 is a schematic cross-sectional view for explaining the structure of a thin film capacitor 6 according to a sixth embodiment of the technology described herein.

As illustrated in FIG. 44, the thin film capacitor 6 according to the sixth embodiment differs from the thin film capacitor 5 according to the fifth embodiment in that the inner wall of the through hole 16 is covered with an insulating resin 26. Other basic configurations are the same as those of the thin film capacitor 5 according to the fifth embodiment, so the same reference numerals are given to the same elements, and overlapping description will be omitted. The insulating resin 26 may be formed after or before the inner wall of the through hole 16 is covered with the dielectric film 13. The presence of the insulating resin 26 can prevent short-circuit between the inner wall of the through hole 16 and the conductive polymer layer 30 more effectively.

Figure 45:
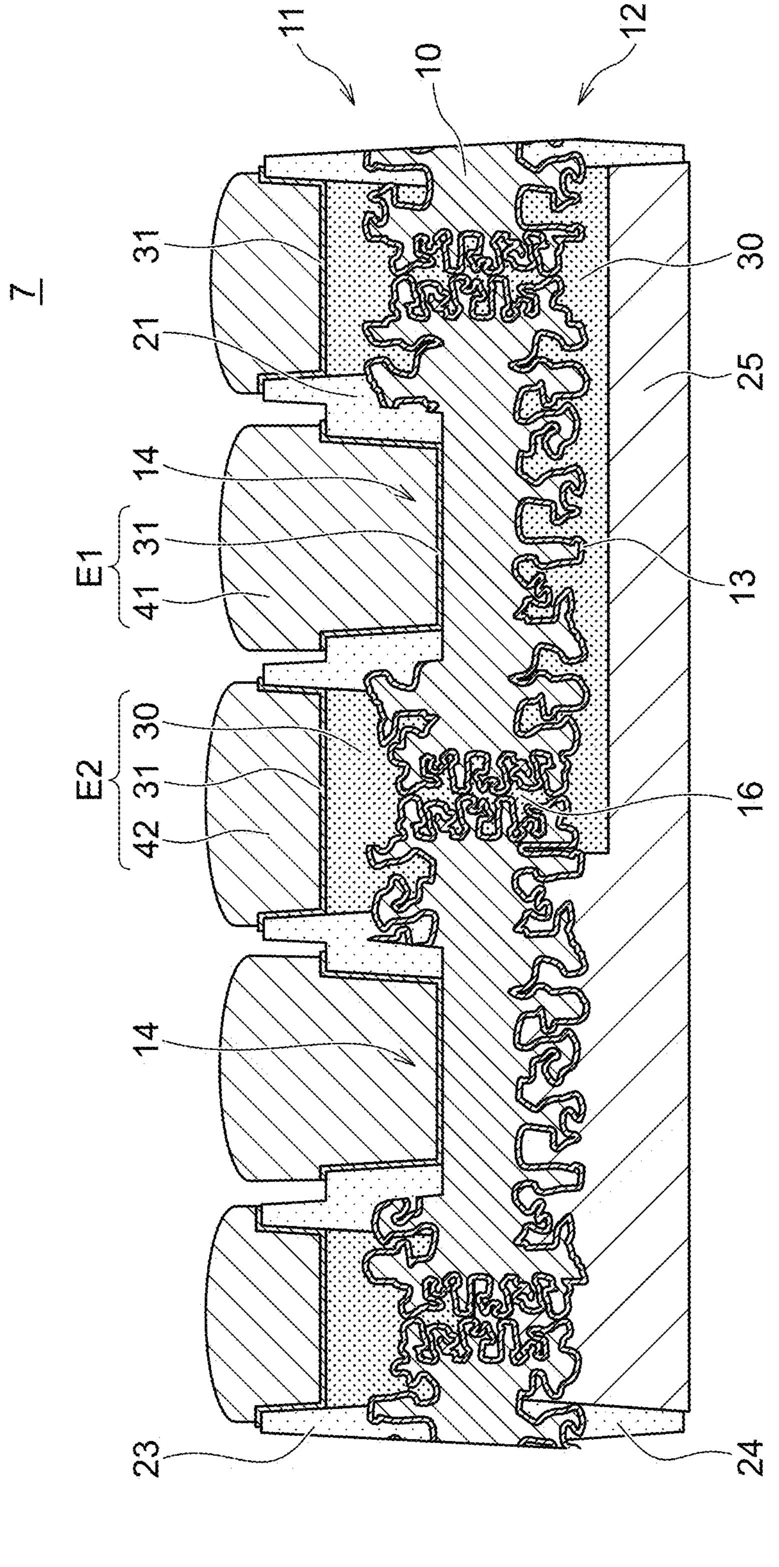
FIG. 45 is a schematic cross-sectional view for explaining the structure of a thin film capacitor 7 according to a third embodiment of the present disclosure.

FIG. 45 is a schematic cross-sectional view for explaining the structure of a thin film capacitor 7 according to a seventh embodiment of the technology described herein.

As illustrated in FIG. 45, the thin film capacitor 7 according to the seventh embodiment differs from the thin film capacitor 4 according to the fourth embodiment in that the conductive polymer layer 30 is provided not entirely but partially on the main surface 12 of the metal foil 10. Other basic configurations are the same as those of the thin film capacitor 4 according to the fourth embodiment, so the same reference numerals are given to the same elements, and overlapping description will be omitted. With this configuration, the dielectric film 13 provided on the main surface 12 side of the metal foil 10 is divided into a region contacting the conductive polymer layer 30 and a region contacting the insulating resin 25 without contacting the conductive polymer layer 30. By thus providing the conductive polymer layer 30 partially on the main surface 12 of the metal foil 10, capacitance can be adjusted.

The above-described thin film capacitors 1 to 7 may be embedded in a multilayer substrate or mounted on the surface of a multilayer substrate.

Figure 46:
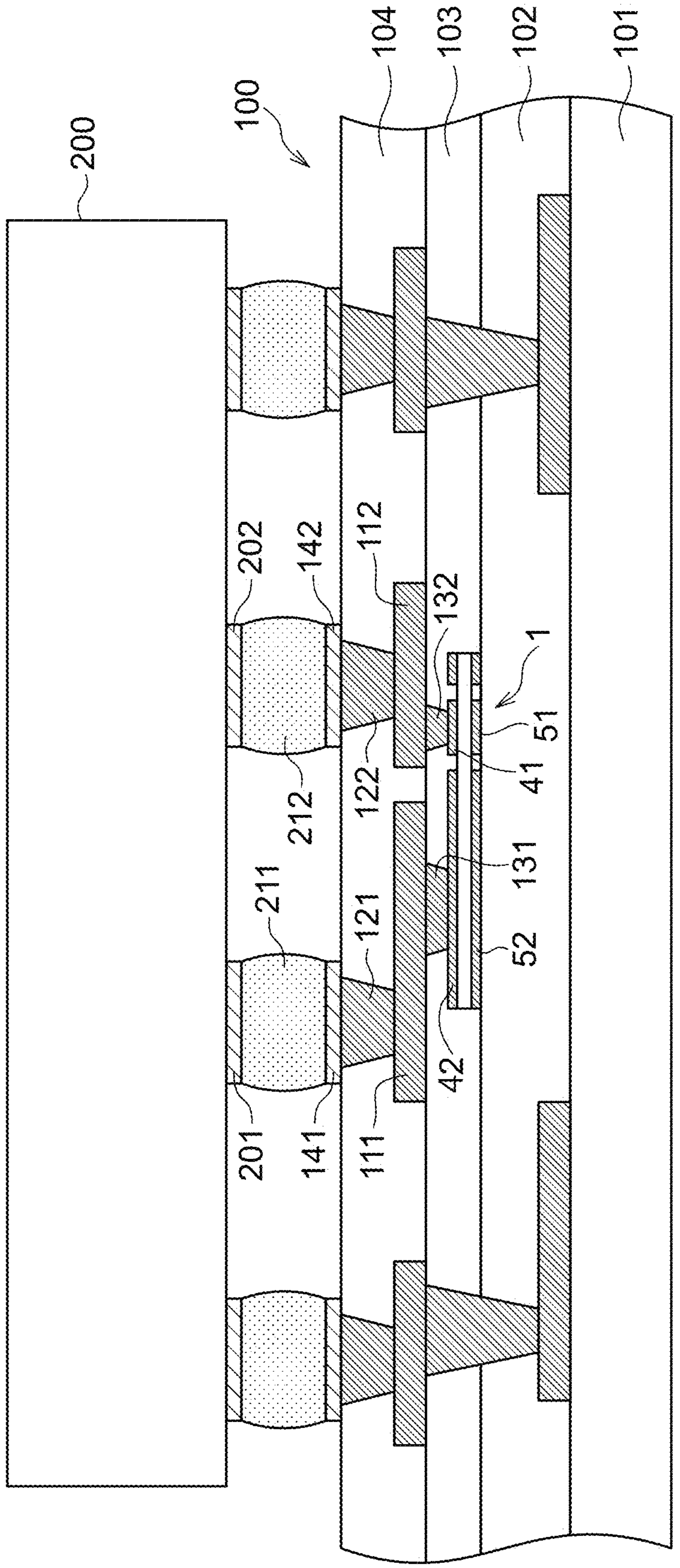
FIG. 46 is a schematic cross-sectional view showing an electronic circuit board having a configuration in which the thin film capacitor 1 is embedded in a multilayer substrate 400.

An electric circuit board illustrated in FIG. 46 has a configuration in which a semiconductor IC 200 is mounted on a multilayer substrate 100. The multilayer substrate 100 includes a plurality of insulating layers including insulating layers 101 to 104 and a plurality of wiring patterns including wiring patterns 111 and 112. The number of the insulating layers is not particularly limited. In the example illustrated in FIG. 46, the thin film capacitor 1 is embedded between the insulating layers 102 and 103. There are provided on the surface of the multilayer substrate 100 a plurality of land patterns including land patterns 141 and 142. The semiconductor IC 200 has a plurality of pad electrodes including pad electrodes 201 and 202. For example, one of the pad electrodes 201 and 202 is a power supply terminal, and the other one thereof is a ground terminal. The pad electrode 201 and land pattern 141 are connected to each other through a solder 211, and the pad electrode 202 and land pattern 142 are connected to each other through a solder 212. The land pattern 141 is connected to the metal terminal 42 of the thin film capacitor 1 through a via conductor 121, the wiring pattern 111, and a via conductor 131. The land pattern 142 is connected to the metal terminal 41 of the thin film capacitor 1 through a via conductor 122, the wiring pattern 112, and a via conductor 132. With this configuration, the thin film capacitor 1 functions as a decoupling capacitor for the semiconductor IC 200. The metal terminals 51 and 52 positioned on the main surface 12 side of the thin film capacitor 1 can also be connected to not-shown wiring patterns.

Figure 47:
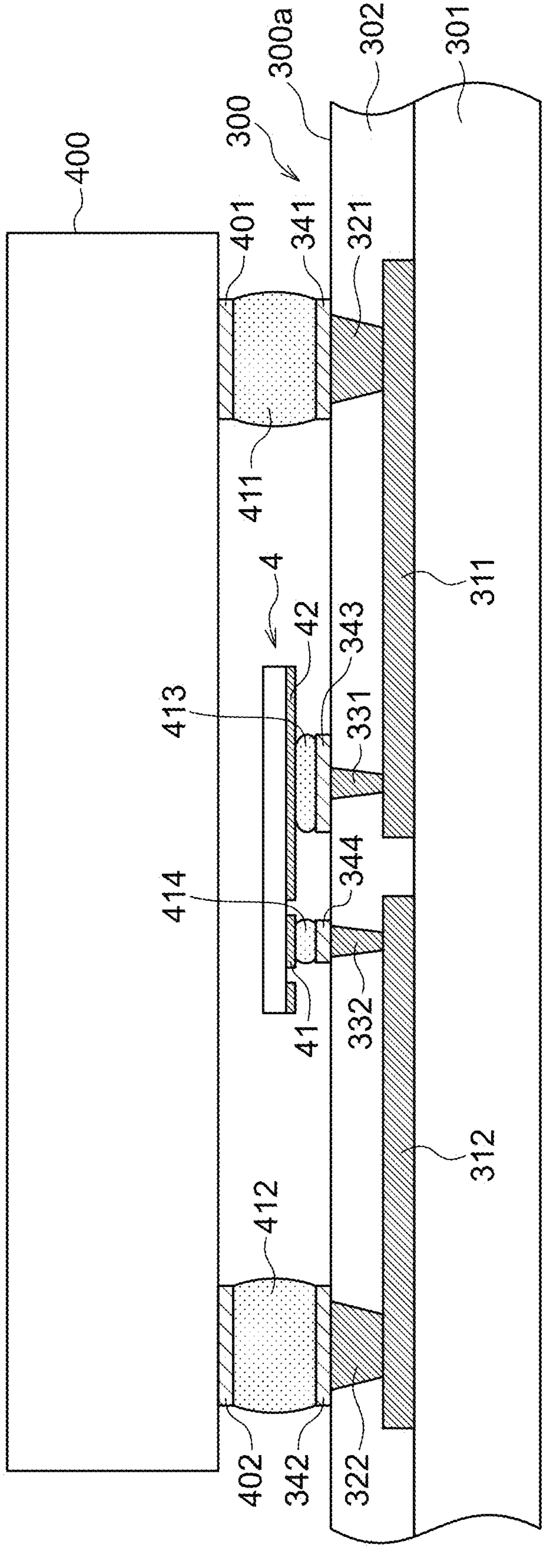
FIG. 47 is a schematic cross-sectional view showing an electronic circuit board having a configuration in which the thin film capacitor 4 is mounted on a multilayer substrate 600.

An electronic circuit substrate illustrated in FIG. 47 has a configuration in which a semiconductor IC 400 is mounted on a multilayer substrate 300. The multilayer substrate 300 includes a plurality of insulating layers including insulating layers 301 and 302 and a plurality of wiring patterns including wiring patterns 311 and 312. The number of the insulating layers is not particularly limited. In the example illustrated in FIG. 47, the thin film capacitor 4 is surface-mounted on a surface 300*a* of the multilayer substrate 300. There are provided on the surface 300*a* of the multilayer substrate 300 a plurality of land patterns including land patterns 341 to 344. The semiconductor IC 400 has a plurality of pad electrodes including pad electrodes 401 and 402. For example, one of the pad electrodes 401 and 402 is a power supply terminal, and the other one thereof is a ground terminal. The pad electrode 401 and land pattern 341 are connected to each other through a solder 411, and the pad electrode 402 and land pattern 342 are connected to each other through a solder 412. The land pattern 341 is connected to the metal terminal 42 of the thin film capacitor 4 through a via conductor 321, the wiring pattern 311, a via conductor 331, the land pattern 343, and a solder 413. The land pattern 342 is connected to the metal terminal 41 of the thin film capacitor 4 through a via conductor 322, the wiring pattern 312, a via conductor 332, the land pattern 344, and a solder 414. With this configuration, the thin film capacitor 4 functions as a decoupling capacitor for the semiconductor IC 400.

While the preferred embodiment of the present disclosure has been described, the present disclosure is not limited to the above embodiment, and various modifications may be made within the scope of the present disclosure, and all such modifications are included in the present disclosure.

REFERENCE SIGNS LIST

1-7 thin film capacitor
10*a* non-porous layer
11, 12 main surface
11*a*, 12*a* porous layer
13 center portion
14, 15 groove
16 through hole
17, 18 recess
21-26 insulating resin
30 conductive polymer layer
31, 32 seed layer
41, 42, 51, 52 metal terminal
60 support substrate
61 adhesive layer
70, 73, 74, 76, 79 resist
71, 75, 77 opening
72, 78 insulating resin
80 support substrate

81 adhesive layer
100 multilayer substrate
101-104 insulating layer
111, 112 wiring pattern
121, 122, 131, 132 via conductor
141, 142 land pattern
200 semiconductor IC
201, 202 pad electrode
211, 212 solder
300 multilayer substrate
300*a* surface
301, 302 insulating layer
311, 312 wiring pattern
321, 322, 331, 332 via conductor
341-344 land pattern
400 semiconductor IC
401, 402 pad electrode
411-414 solder
E1-E4 electrode layer

The invention claimed is:

1. A thin film capacitor comprising:

a metal foil having a first main surface and a second main surface opposite to the first main surface, both the first and second main surfaces being roughened;

a first dielectric film covering the first main surface of the metal foil;

a second dielectric film covering the second main surface of the metal foil;

a first electrode layer contacting the metal foil through an opening formed in the first dielectric film and having a surface formed as a first metal terminal;

a second electrode layer contacting the first dielectric film without contacting the metal foil and having a surface formed as a second metal terminal; and a third electrode layer contacting the second dielectric film without contacting the metal foil, wherein the second electrode layer includes a first conductive polymer layer contacting the first dielectric film, wherein the third electrode layer includes a second conductive polymer layer contacting the second dielectric film, wherein the metal foil has a through hole, wherein an inner wall of the through hole is covered with a third dielectric film, and wherein a third conductive polymer layer connecting the first and second conductive polymer layers is provided in a region surrounded by the inner wall of the through hole.

2. The thin film capacitor as claimed in claim 1, wherein third electrode layer further includes a third metal terminal connected to the second conductive polymer layer.

3. The thin film capacitor as claimed in claim 2, further comprising an insulating resin covering the second conductive polymer layer, wherein the third metal terminal contacts the second conductive polymer layer through an opening formed in the insulating resin.

4. The thin film capacitor as claimed in claim 2, further comprising a fourth electrode layer contacting the metal foil through an opening formed in the second dielectric film and having a surface formed as a fourth metal terminal.

5. The thin film capacitor as claimed in claim 1, further comprising an insulating resin covering the second conductive polymer layer, wherein the second dielectric film includes a first region contacting the second conductive polymer layer and a second region contacting the insulating resin without contacting the second conductive polymer layer.

6. The thin film capacitor as claimed in claim 1, wherein the inner wall of the through hole is roughened.

7. An electronic circuit board comprising:

a substrate having a wiring pattern; and a semiconductor IC and the thin film capacitor as claimed in claim 1 each provided in the substrate, wherein the first and second electrode layers of the thin film capacitor are connected to the semiconductor IC through the wiring pattern.

8. A method of manufacturing a thin film capacitor, the method comprising:

roughening a first main surface of a metal foil and a second main surface opposite to the first main surface;

forming first and second dielectric films respectively on the first and second main surfaces of the metal foil;

exposing a part of the metal foil by removing a part of the first dielectric film;

covering the first and second dielectric films respectively with first and second conductive polymer layers;

forming a first electrode layer contacting the part of the metal foil and having a surface formed as a first metal terminal;

forming a second metal terminal connected to the first conductive polymer layer;

forming a through hole whose inner wall is covered with a third dielectric film in the metal foil before forming the first and second conductive polymer layers; and forming a third conductive polymer layer connecting the first and second conductive polymer layers in a region surrounded by the inner wall of the through hole.

9. The method of manufacturing a thin film capacitor as claimed in claim 8, further comprising forming a third metal terminal connected to the second conductive polymer layer.

10. The method of manufacturing a thin film capacitor as claimed in claim 9, further comprising:

exposing another part of the metal foil by removing a part of the second dielectric film; and forming a fourth electrode layer contacting the exposed another part of the metal foil and having a surface formed as a fourth metal terminal.

* * * * *